United States Patent
Ryu et al.

(10) Patent No.: US 10,929,007 B2
(45) Date of Patent: Feb. 23, 2021

(54) METHOD OF DISPLAYING OBJECT ON DEVICE, DEVICE FOR PERFORMING THE SAME, AND RECORDING MEDIUM FOR PERFORMING THE METHOD

(71) Applicant: SAMSUNG ELECTRONICS CO., LTD., Suwon-si (KR)

(72) Inventors: Sung-uk Ryu, Suwon-si (KR); Yu-sung Joo, Yongin-si (KR); Yo-han Kim, Suwon-si (KR); Eun-kyo Baek, Seoul (KR); Jong-won Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 477 days.

(21) Appl. No.: 14/932,512

(22) Filed: Nov. 4, 2015

(65) Prior Publication Data
US 2016/0124617 A1    May 5, 2016

(30) Foreign Application Priority Data

Nov. 5, 2014 (KR) .................. 10-2014-0152858

(51) Int. Cl.
*G06F 3/0488* (2013.01)
*G06F 3/0484* (2013.01)
(Continued)

(52) U.S. Cl.
CPC ........ *G06F 3/04883* (2013.01); *G06F 3/0482* (2013.01); *G06F 3/04842* (2013.01);
(Continued)

(58) Field of Classification Search
CPC .......................... G06F 3/0488; G06F 3/04883
See application file for complete search history.

(56) References Cited

U.S. PATENT DOCUMENTS 8,797,317 B2 * 8/2014 Kim ..................... G06F 3/016
345/419
8,890,818 B2    11/2014 Arrasvuori et al.
(Continued)

FOREIGN PATENT DOCUMENTS

CN    102073454 A    5/2011
CN    102693069 A    9/2012
(Continued)

OTHER PUBLICATIONS

Communications dated Feb. 18, 2016 issued by the Int. Searching Authority in counterpart Application No. PCT/KR2015/011631 (PCT/ISA/220, 210 & 237).
(Continued)

*Primary Examiner* — William L Bashore
*Assistant Examiner* — Nathan K Shrewsbury
(74) *Attorney, Agent, or Firm* — Sughrue Mion, PLLC

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. Provided are methods, apparatuses and systems for controlling an object displayed on a device, based on a hovering input obtained by the device.

18 Claims, 30 Drawing Sheets

(51) Int. Cl.
*G06F 3/0482* (2013.01)
*G06F 40/117* (2020.01)

(52) U.S. Cl.
CPC ........ *G06F 3/04847* (2013.01); *G06F 40/117* (2020.01); *G06F 2203/04101* (2013.01); *G06F 2203/04806* (2013.01)

(56) References Cited

U.S. PATENT DOCUMENTS

| | | | | |
|---|---|---|---|---|
| 9,030,418 | B2* | 5/2015 | Ku | G06F 3/0488 345/173 |
| 9,372,570 | B2 | 6/2016 | Ketola et al. | |
| 9,699,286 | B2* | 7/2017 | Yun | H04M 1/72519 |
| 9,715,482 | B1* | 7/2017 | Bjorkegren | G06F 17/24 |
| 10,182,108 | B2 | 1/2019 | Kimchi et al. | |
| 10,318,034 | B1* | 6/2019 | Hauenstein | G06F 3/0412 |
| 10,732,719 | B2* | 8/2020 | Mese | G06F 3/04817 |
| 2003/0016253 | A1* | 1/2003 | Aoki | G06F 1/1626 715/863 |
| 2006/0209040 | A1* | 9/2006 | Garside | G06F 3/04886 345/173 |
| 2007/0047002 | A1* | 3/2007 | Hull | G06F 16/434 358/3.28 |
| 2008/0281578 | A1* | 11/2008 | Kumaran | G06F 17/28 704/2 |
| 2009/0254337 | A1* | 10/2009 | Sprecher | G06F 17/271 704/9 |
| 2009/0289914 | A1* | 11/2009 | Cho | G06F 3/04883 345/173 |
| 2009/0315848 | A1* | 12/2009 | Ku | G06F 3/0416 345/173 |
| 2010/0013792 | A1* | 1/2010 | Fukushima | G06F 3/03547 345/174 |
| 2010/0174993 | A1* | 7/2010 | Pennington | G06F 3/04817 715/738 |
| 2010/0238521 | A1* | 9/2010 | Rusman | G06F 3/014 358/475 |
| 2010/0259493 | A1* | 10/2010 | Chang | G06F 3/04883 345/173 |
| 2010/0321345 | A1* | 12/2010 | Pearce | G06F 3/03545 345/179 |
| 2010/0328351 | A1* | 12/2010 | Tan | G06F 3/0481 345/661 |
| 2011/0063224 | A1* | 3/2011 | Vexo | G06F 3/04886 345/168 |
| 2011/0234491 | A1 | 9/2011 | Nurmi | |
| 2011/0271179 | A1* | 11/2011 | Jasko | G06F 16/34 715/256 |
| 2011/0279397 | A1* | 11/2011 | Rimon | G06F 3/044 345/173 |
| 2011/0316679 | A1 | 12/2011 | Pihlaja | |
| 2011/0316790 | A1* | 12/2011 | Ollila | G06F 3/04883 345/173 |
| 2012/0068941 | A1* | 3/2012 | Arrasvuori | G06F 3/04883 345/173 |
| 2012/0242584 | A1* | 9/2012 | Tuli | G06F 3/016 345/173 |
| 2012/0242652 | A1* | 9/2012 | Kim | G06F 3/016 345/419 |
| 2012/0299851 | A1* | 11/2012 | Homma | G06F 3/0488 345/173 |
| 2012/0306765 | A1 | 12/2012 | Moore | |
| 2012/0306766 | A1 | 12/2012 | Moore | |
| 2013/0106719 | A1* | 5/2013 | Sundara-Rajan | G06F 3/03545 345/173 |
| 2013/0117698 | A1* | 5/2013 | Park | G06F 3/04817 715/765 |
| 2013/0120295 | A1* | 5/2013 | Kim | G06F 3/01 345/173 |
| 2013/0207937 | A1* | 8/2013 | Lutian | G06F 3/042 345/175 |
| 2014/0101579 | A1* | 4/2014 | Kim | G06F 3/04883 715/761 |
| 2014/0152623 | A1 | 6/2014 | Lee et al. | |
| 2014/0168176 | A1* | 6/2014 | Nowatzyk | G06F 3/0346 345/179 |
| 2014/0201637 | A1* | 7/2014 | Na | G06F 3/04847 715/719 |
| 2014/0203999 | A1* | 7/2014 | Shim | H04L 67/02 345/2.2 |
| 2014/0218343 | A1* | 8/2014 | Hicks | G06F 3/03545 345/179 |
| 2014/0253465 | A1* | 9/2014 | Hicks | G06F 3/03545 345/173 |
| 2014/0267130 | A1 | 9/2014 | Hwang et al. | |
| 2014/0347298 | A1* | 11/2014 | Park | G06F 1/1626 345/173 |
| 2014/0359539 | A1* | 12/2014 | Locker | G06F 3/0488 715/863 |
| 2015/0015741 | A1* | 1/2015 | Kim | H04N 5/23293 348/239 |
| 2015/0052481 | A1* | 2/2015 | Ronkainen | G06F 3/0416 715/815 |
| 2015/0077338 | A1* | 3/2015 | Dai | G06F 3/0488 345/157 |
| 2015/0193392 | A1* | 7/2015 | Greenblatt | G06Q 10/109 715/205 |
| 2015/0220299 | A1* | 8/2015 | Kim | G06F 1/1635 345/1.3 |
| 2015/0301719 | A1* | 10/2015 | Shinde | G06F 3/04842 715/808 |
| 2016/0103655 | A1* | 4/2016 | Klein | G06F 3/167 704/275 |
| 2016/0188181 | A1* | 6/2016 | Smith | G06F 3/0414 715/765 |
| 2017/0123592 | A1* | 5/2017 | Nakao | G06F 3/04886 |
| 2017/0160914 | A1* | 6/2017 | Niranjani | G06F 3/04842 |

FOREIGN PATENT DOCUMENTS

| | | |
|---|---|---|
| CN | 103026329 A | 4/2013 |
| CN | 103210366 A | 7/2013 |
| CN | 103310359 A | 9/2013 |
| EP | 2 416 234 A2 | 2/2012 |
| EP | 2 503 438 A2 | 9/2012 |
| KR | 10-2013-0058752 A | 6/2013 |
| KR | 10-2014-0005356 A | 1/2014 |
| KR | 10-2014-0007949 A | 1/2014 |
| WO | 2014143556 A1 | 9/2014 |

OTHER PUBLICATIONS

Communication dated Jun. 7, 2017 issued by the European Patent Office in counterpart European Patent Application No. 15857212.3.
Communication dated Nov. 5, 2019, issued by the State Intellectual Property Office of P.R. China in counterpart Chinese Application No. 201580071059.2.
Communication dated May 9, 2020 issued by the State Intellectual Property Office of P.R. China in counterpart Chinese Application No. 201580071059.2.
Communication dated Oct. 12, 2020, issued by the State Intellectual Property Office of P.R. China in counterpart Chinese Application No. 201580071059.2.

* cited by examiner

METHOD OF DISPLAYING OBJECT ON DEVICE, DEVICE FOR PERFORMING THE SAME, AND RECORDING MEDIUM FOR PERFORMING THE METHOD

CROSS-REFERENCE TO RELATED APPLICATION

This application claims the benefit of Korean Patent Application No. 10-2014-0152858, filed on Nov. 5, 2014, in the Korean Intellectual Property Office, the disclosure of which is incorporated herein in its entirety by reference.

BACKGROUND

1. Field

The present disclosure relates to methods of displaying an object on a device, the device for displaying an object, and a computer-readable medium for performing the method.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

SUMMARY

Provided are methods, apparatuses and systems for controlling an object displayed on a device, based on a hovering input obtained by the device.

Additional aspects will be set forth in part in the description which follows and, in part, will be apparent from the description, or may be learned by practice of the presented exemplary embodiments.

According to an aspect of an exemplary embodiment, a method of displaying an object, the method being performed by a device, includes determining a target object from among at least one object displayed on the device, when the device detects a hovering inputter; determining an operation, from among a plurality of predetermined operations that are performable by the device, based on location information of the hovering inputter detected by the device; and performing the determined operation on the target object.

The location information of the hovering inputter may be determined according to a distance between the device and the hovering inputter.

The determining of the target object may further include determining an object that includes an identification mark, from among at least one object located within a predetermined distance from a location where the hovering inputter is detected, as the target object.

The determining of the operation may further include determining the operation based on the identification mark of the target object and the location information of the inputter.

The determining of the operation may further include: determining a type of operation based on the location information of the hovering inputter; and determining a particular operation with respect to the determined type of operation, based on a movement of the hovering inputter.

The plurality of predetermined operations comprises an operation of changing a location of the determined target object, an operation of deleting the determined target object, and an operation of changing at least one from among a color, a shape, and a size of the determined target object.

The method may further include obtaining a user input of changing from a first application, the first application including the at least one object, to a second application, and the performing of the determined operation may further include changing to the second application and performing the determined operation on the target object in the second application.

The obtained user input may further include a second hovering input generated by the hovering inputter, and the method may further include selecting a second application which is different from the first application that includes the at least one object, based on second location information, the second location information being determined based on a distance between the device and the hovering inputter.

The device may execute the first application by outputting a first content including the at least one object, and the device may execute the second application by outputting a second content.

The method may further include determining a second operation when the location information of the hovering inputter changes within a predetermined time period, and performing the second operation on the target object.

According to another aspect of an exemplary embodiment, a device configured to display an object includes an input receiver configured to obtain a hovering input from a hovering inputter; a controller configured to determine a target object from among at least one object displayed on the device, when the device detects a hovering inputter, and determine an operation, from among a plurality of predetermined operations that are performable by the device, based on location information of the hovering inputter detected by the device; and an outputter configured to perform the determined operation on the target object.

Location information of the hovering inputter may be determined according to a distance between the device and the hovering inputter.

The controller may be further configured to determine an object that includes an identification mark, from among at least one object located within a predetermined distance from a location where the hovering inputter is detected, as the target object.

The controller may be further configured to determine the operation based on the identification mark of the target object and the location information of the inputter.

The controller may be further configured to determine a type of operation based on the location information of the hovering inputter, and to determine a particular operation with respect to the determined type of operation, based on movement of the hovering inputter.

The plurality of operations may include an operation of changing a location of the determined target object, an operation of deleting the determined target object, and an operation of changing at least one of a color, a shape, and a size of the determined target object.

The inputter may be further configured to obtain a user input of changing from a first application including the at least one object to a second application executed by the device, and the outputter may be further configured change to the second application and to perform the determined operation on the target object in the second application.

The obtained user input may include a second hovering input generated by the hovering inputter, and the controller may be further configured to select a second application which is different from the first application that includes the at least one object, based on second location information, the second location information being determined based on a distance between the device and the hovering inputter.

The device may execute a first application by outputting a first content including the at least one object, and the device may execute a the second application by outputting a second content.

The controller may be further configured to select a second operation when the location information of the hovering inputter changes within a predetermined time period, and the outputter may be further configured to perform the second operation on the target object.

A non-transitory computer-readable recording storage medium may have stored thereon a computer program which, when executed by a computer, performs the method above.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
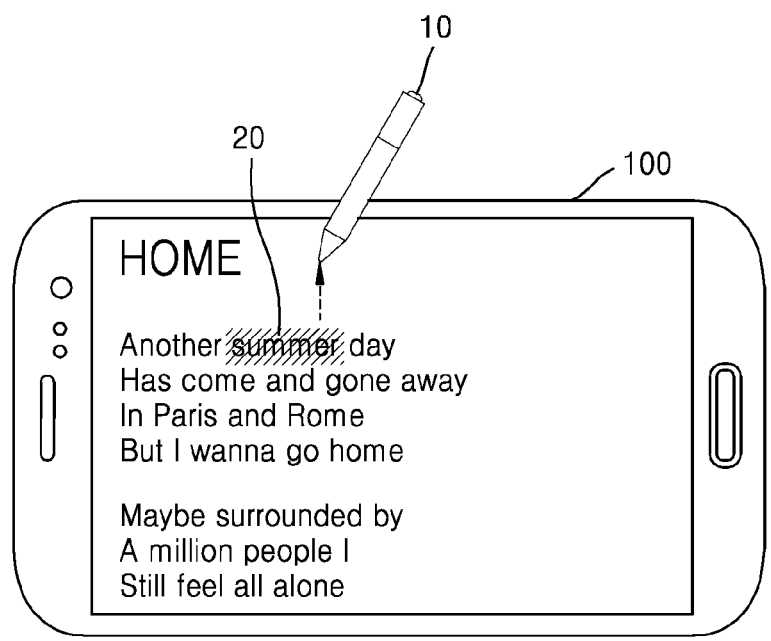
FIG. 1 illustrates a conceptual diagram for explaining a method of outputting an object, which is performed by a device, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Exemplary embodiments will now be described more fully with reference to the accompanying drawings. The inventive concept may, however, be embodied in many different forms and should not be construed as being limited to the embodiments set forth herein. In the description of exemplary embodiments, certain detailed explanations of the related art are omitted when it is deemed that they may unnecessarily obscure the essence of the inventive concept. Like numbers refer to like elements throughout the description of the figures.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

Hereinafter, exemplary embodiments will be described in detail with reference to the attached drawings.

FIG. 1 illustrates a conceptual diagram for explaining a method of outputting an object, which is performed by a device 100, according to an exemplary embodiment.

Referring to FIG. 1, the device 100 may obtain a plurality of types of user inputs. The plurality of types of user inputs may vary with units of changing electrical signals generated in the device 100. For example, the plurality of types of user inputs may include a touch input or a hovering input. The touch input refers to an input method performed when a user touches the device 100 with a touch inputter so as to change an electrical signal generated in the device 100. Additionally, a hovering input may refer to an input method performed when a user does not contact a hovering inputter 10 with the device 100, but instead places the hovering inputter 10 within a predetermined range of distance from the device 100 so as to change an electrical signal generated in the device 100. In some exemplary embodiments, the touch inputter may be identical to the hovering inputter. Hereinafter, for convenience of description, a hovering input is described as an exemplary example of a user input.

The device 100 obtains a hovering input by a user. If the user places the hovering inputter 10 within a certain range of distance from the device 100, the device 100 may detect the hovering inputter 10. For example, if the hovering inputter 10 gets close to the device 100 within a predetermined range of distance from the device 100, a capacitance of an electrical signal generated in the device 100 may be changed. A capacitance of an electrical signal generated in the device 100 may be changed according to at least one selected from the group consisting of a distance between the device 100 and the hovering inputter 10, and movement of the hovering inputter 10. The device 100 may identify a type of a hovering input according to a degree in which the capacitance is changed. However, a method of detecting the hovering input 10, which is described above and performed by the device 100, is only an example. A general proximity sensing technology that allows detection of an inputter in a non-contact state may be employed as a method of detecting the hovering inputter 10, which is performed by the device 100.

The device 100 may execute an application that performs various functions. An application, described herein, may be a set of computer programs designed for executing a particular job. Applications described herein may vary. For example, the applications described herein may include a digital book application, a document editing application, a memo application, a diary application, a photograph application, or a phone book application, but is not limited thereto.

If the device 100 executes an application, at least one piece of content related to the application may be displayed on a screen of the device 100. Content may be a set of data that is created by using text, images, moving images, or the like and output when an application is executed. For example, if the device 100 executes a digital book playback application, content may include respective pages consisting of a digital book. As another example, if the device 100 executes a web browser application, content may include respective web pages.

The device 100 may execute a plurality of applications. The device 100 may select an application that includes content to be displayed on a screen, from among the plurality of applications, based on a user input.

Content displayed on the device 100 may include at least one type of object selected from the group consisting of images, text, and moving images. For example, if the device 100 executes a digital book playback application, objects may correspond respectively to text, an image, and moving images included in a page constituting a digital book. As another example, if the device 100 executes a web browser application, objects may correspond respectively to text, images, and moving images which are included in a web page.

The device 100 may detect an object that includes an identification mark, from among a plurality of objects. The identification mark, described herein, may include an image which includes various patterns and is displayed on an object by a user. According to an exemplary embodiment, if the hovering inputter 10 is detected, the device 100 may detect an object that includes an identification mark. Hereinafter, an object that includes an identification mark is referred to as a target object 20.

The device 100 may perform an operation, corresponding to a hovering input generated by the hovering inputter 10, on the target object 20. The operation corresponding to the hovering input may be predetermined with respect to metadata regarding an application. Information about a hovering input, determined according to a distance between the device 100 and the hovering inputter 10, and an operation corresponding to the determined hovering input may be stored in the metadata regarding the application. For example, if the device 100 executes a digital book playback application, the device 100 may detect text data that includes an identification mark as a target object 20. The device 100 may perform an operation of changing a location of text data corresponding to a distance z between the hovering inputter 10 and the device 100, from among operations of editing a plurality of pieces of text data which may be performed on the text data by using the digital book playback application. The distance z can, for example, correspond to a distance between the hovering inputter 10 and the device 100 in a direction that is normal or orthogonal to a plane formed by a display on the device 100.

Information about a method of performing a determined operation according to movement of the hovering inputter 10 may be stored in the metadata regarding the application. For example, if an operation of moving text data that is the target object 20 is determined according to a distance between the hovering inputter 10 and the device 100, the device 100 may determine a direction in which the text data is moved, based on movement of the hovering inputter 10.

Figure 2:
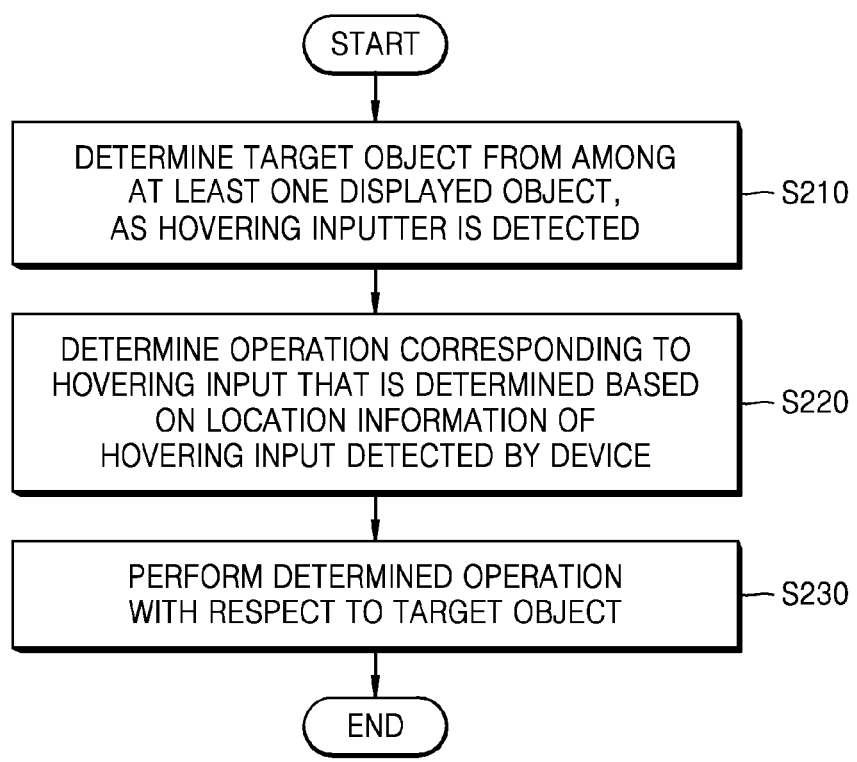
FIG. 2 illustrates a flowchart of a method of displaying an object, which is performed by the device, according to an exemplary embodiment.

FIG. 2 illustrates a flowchart of a method of displaying an object, which is performed by the device 100, according to an exemplary embodiment.

In operation S210, as the device 100 detects the hovering inputter 10, the device 100 determines the target object 20, from among at least one object displayed on the device 100. The target object 20 may be distinguished from other objects by using an identification mark generated by a user. For example, a user may display an image consisting of a plurality of diagonal lines on an object from among at least one objects displayed on the device 100. The device 100 may determine an object, in which an image consisting of a plurality of diagonal lines is displayed, as the target object 20. An exemplary method of determining a target object, which may be performed by the device 100, will be described in detail below with reference to FIG. 3.

If the device 100 detects the hovering inputter 10, the device 100 determines the target object 20. If the hovering inputter 10 is located within a predetermined range of distance from the device 10, the device 100 may determine the target object 20. As another example, if the hovering inputter 10 is located within a predetermined range of distance from the device 10 for at least a critical period of time, the device 100 may detect the target object 20. The device 100 may prevent malfunction of the hovering inputter 10 and clearly understand a user's intention for determining the hovering inputter 10, by setting a critical period of time for which the device 100 may detect the hovering inputter 10.

In operation S220, the device 100 determines an operation corresponding to a hovering input that is determined based on location information of the hovering inputter 10 detected by the device 100, from among a plurality of predetermined operations that may be performed with respect to the target object 20. The device 100 may obtain location information of the hovering inputter 10. The location information of the hovering inputter 10 may be determined based on a distance between the device 100 and the hovering inputter 10. The distance may be a distance between a side of the hovering inputter 10, which includes a material that may change an electrical signal of the device 100, and the device 100. For example, if the hovering inputter 10 is located at a height z with respect to a screen of the device 100, a distance between the device 100 and the hovering inputter 10 may be determined as z.

The device 100 may identify a hovering input, based on location information of the hovering inputter 10. For example, the device 100 may identify a hovering input having z2 as location information of the hovering inputter 10, and a hovering input having z1 as location information of the hovering inputter 10.

The device 100 may store metadata regarding an application which includes information about an operation corresponding to the identified hovering input. For example, if the device 100 executes the digital book playback application, information about an operation of deleting text data corresponding to a hovering input having z1 as location information, and information about an operation of copying text data corresponding to a hovering input having z2 as location information may be stored in metadata regarding the digital book playback application.

The device 100 may determine an operation corresponding to a hovering input generated by the hovering inputter 10, by comparing the obtained location information of the hovering inputter 10 to metadata regarding an application that is already stored.

In operation S230, the device 100 performs an operation determined with respect to the target object 20. According to an exemplary embodiment, the device 100 may perform a determined operation on content that includes the target object 20. As another example, the device 100 may perform a determined operation on another content that does not include the target object 20. The other content may be included in an application which includes content that includes the target object 20 or may be included in another application. This is described in detail with reference to FIGS. 13 through 15.

Figure 3:
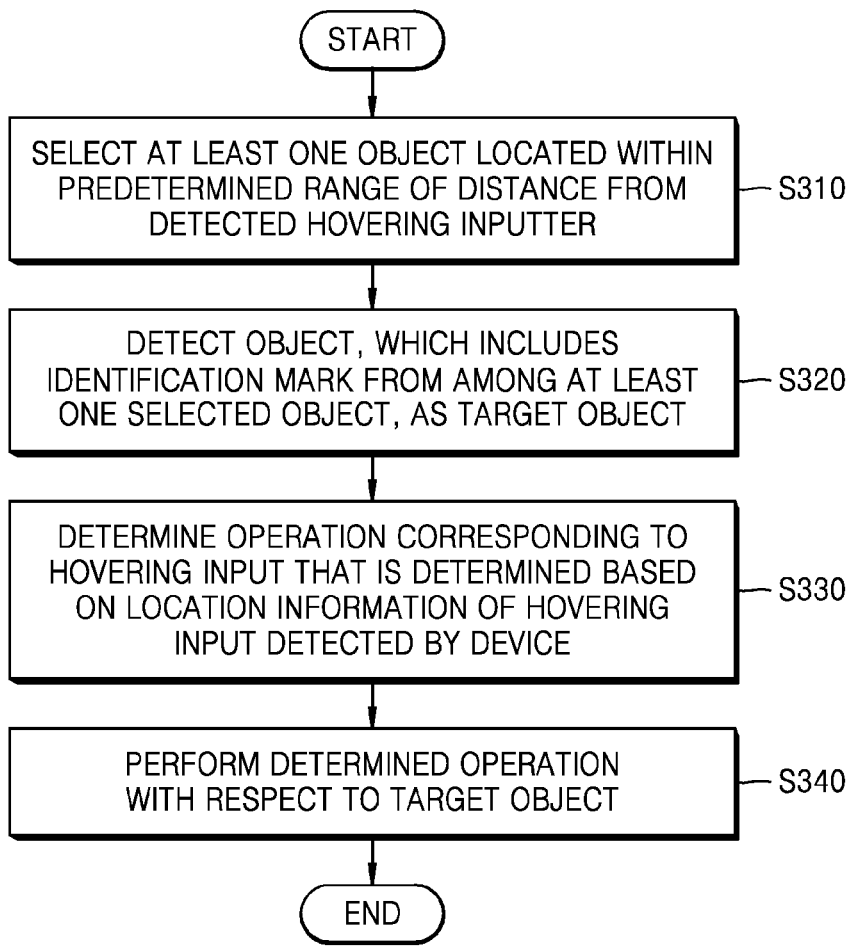
FIG. 3 illustrates a flowchart of a method of determining a target object from among at least one displayed object, which is performed by the device, according to an exemplary embodiment.

FIG. 3 illustrates a flowchart of a method of determining the target object 20 from among at least one displayed object, which is performed by the device 100, according to an exemplary embodiment.

In operation S310, the device 100 may select at least one object that is displayed within a predetermined range of area from the hovering inputter 10 that is detected by the device 100. The device 100 may obtain location information of the hovering inputter 10. The device 100 may determine a location corresponding to the hovering inputter 10 on a screen of the device 100, by using the obtained location information of the hovering inputter 10. If a location of the hovering inputter 10 is expressed, for example, based on three-dimensional (3D) x-y-z location information using a screen of the device as a reference surface, the location corresponding to the hovering inputter 10 may include a location corresponding to x, y and z coordinates with respect to the screen of device 100. However, this is only an exemplary embodiment, and a method of determining a location corresponding to the hovering inputter 10 on a screen of the device 100 is not limited thereto.

The device 100 may select at least one object located within a certain range of distance from a location corresponding to the hovering inputter 10 on a screen of the device 100. For example, the device 100 may select at least one object within a radius of 2 cm from a first location on the screen of the device 100.

In operation S320, the device 100 may detect an object that includes an identification mark, from among the selected at least one object, as the target object 20. The identification mark may include an image in various patterns generated by a user. For example, the device 100 may detect an object in which an image consisting of a plurality of diagonal lines is marked, from among the selected at least one object, as the target object 20.

In operation S330, the device 100 may determine an operation corresponding to a hovering input that is determined based on location information of the hovering inputter 10 detected by the device 100, from among a plurality of predetermined operations that may be performed with respect to the target object 20. The device 100 may identify the hovering input, based on location information of the hovering inputter 10. According to an exemplary embodiment, the device 100 may determine an operation corresponding to the identified hovering input, by using metadata regarding an application that is being executed by the device 100.

Operation S330 may, for example, correspond to operation 220 described with reference to FIG. 2.

In operation S340, the device 100 may perform the determined operation on the target object 20. The device 100 may perform the determined operation on the target object 20, by changing content displayed on a screen according to a user input. An example of this will be described in detail below with reference to FIGS. 13 through 15.

Operation 340 may correspond to operation 230 described with reference to FIG. 2.

Figure 4A:
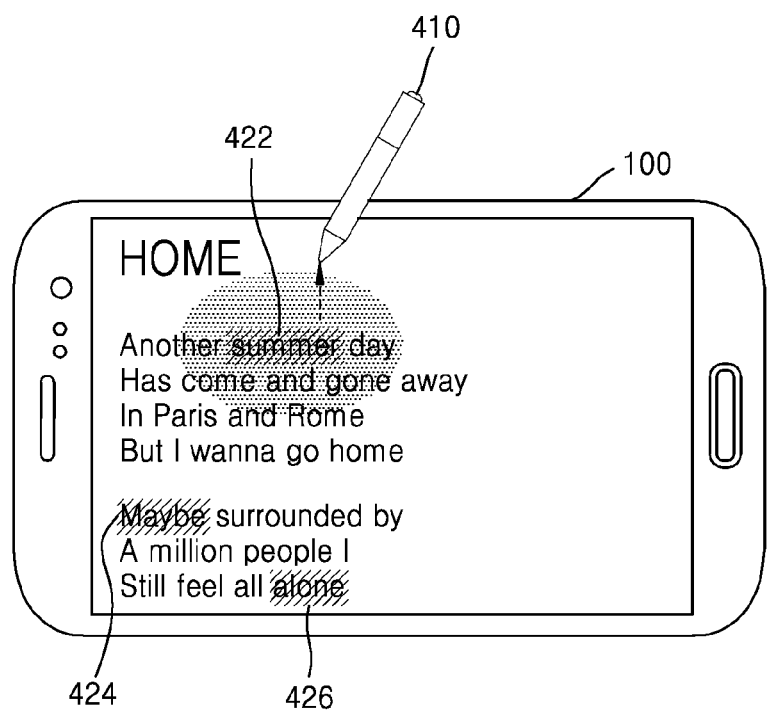
FIGS. 4A and 4B illustrate a diagram for explaining in detail a method of determining a target object from among at least one displayed object, which is performed by the device, according to an exemplary embodiment.
Figure 4B:
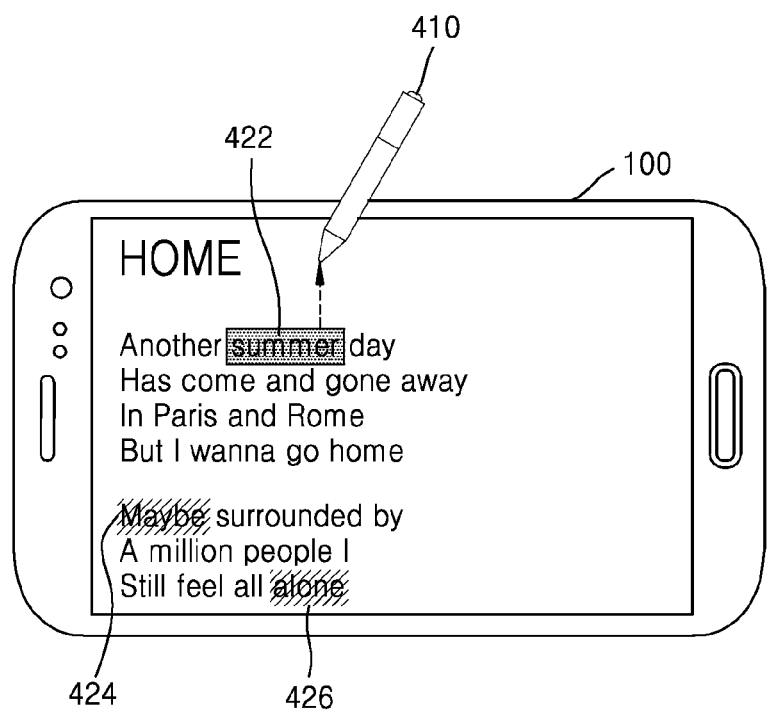

FIGS. 4A and 4B illustrate diagrams for explaining in detail a method of determining a target object from among at least one displayed object, which is performed by the device 100, according to an exemplary embodiment.

Referring to FIG. 4A, the device 100 may execute a web browser application. An article found by a user using a web browser, from among at least one piece of content regarding a web browser application, may be displayed on the device 100.

At least one object that includes text data may be displayed in an article displayed on a screen of the device 100. If a type of an object is text, the device 100 may identify the object included in content in the units of characters, words, or sentences.

According to an exemplary embodiment, the device 100 may determine an object 422 that includes an identification mark, from among at least one object located within a predetermined range of distance from a location in which the hovering inputter 10 is detected, as a target object.

However, this is only an exemplary embodiment. The device 100 may determine all objects 422, 424, and 426 which respectively include an identification mark, from among at least one piece of content displayed on the screen, as target objects.

Referring to FIG. 4B, the device 100 may display information indicating that the target objects 422, 424, and 426 are determined. For example, the device 100 may display information indicating that the target objects 422, 424, and 426 are determined, by changing a color or a shape of the respective identification marks that were displayed on target objects 422, 424, and 426.

Figure 5:
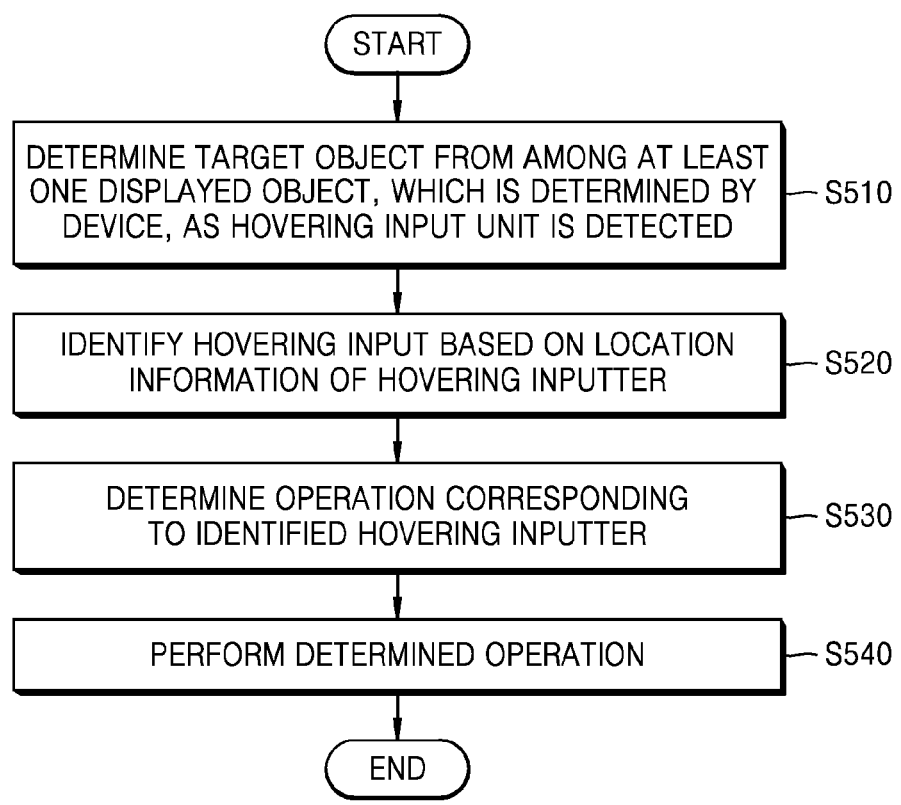
FIG. 5 illustrates a flowchart of a method of determining an operation corresponding to a hovering input based on detected location information of a hovering inputter, which is performed by the device, according to an exemplary embodiment.

FIG. 5 illustrates a flowchart of a method of determining an operation corresponding to a hovering input based on location information of the detected hovering inputter 10, which is performed by the device 100, according to an exemplary embodiment.

In operation S510, as the device 100 detects the hovering inputter 10, the device 100 determines the target object 20, from among at least one object displayed on the device 100. The target object 20 may be distinguished from other objects by using an identification mark generated by a user.

Operation S510 may, for example, correspond to operation 210 described with reference to FIG. 2.

In operation S520, the device 100 may identify a hovering input, based on location information of the hovering inputter 10. The location information of the hovering inputter 10 may be determined based on a distance between the device 100 and the hovering inputter 10. For example, the device 100 may identify a hovering input in which location information is z1, and a hovering input in which location information is z2.

In operation S530, the device 100 may determine an operation corresponding to the identified hovering input. The device 100 may store metadata regarding an application that includes information about an operation corresponding to the identified hovering input. For example, if the device 100 executes a document editing application, information about an operation of cutting text data corresponding to a hovering input in which location information of the hovering inputter 10 is z1 and an operation of deleting text data corresponding to a hovering input in which location information of the hovering inputter 10 is z2 may be stored in the metadata regarding the document editing application.

In operation S540, the device 100 may perform the determined operation.

The device 100 may perform the determined operation on the target object 20, by changing content displayed on a screen according to a user input. An example of this will be described below with reference to FIGS. 13 through 15.

FIG. 6 illustrates a detailed diagram for explaining in detail a method of determining an operation corresponding to a hovering input based on location information of the detected hovering inputter 10, which is performed by the device 100, according to an exemplary embodiment.

Referring to FIG. 6, the device 100 may execute a document editing application.

If a hovering inputter 610 is detected, the device 100 may determine a target object 620 that includes an identification mark. The device 100 may determine an operation from among a plurality of predetermined operations that may be performed with respect to the target object 620, by using location information of the hovering inputter 610.

Figure 6A:
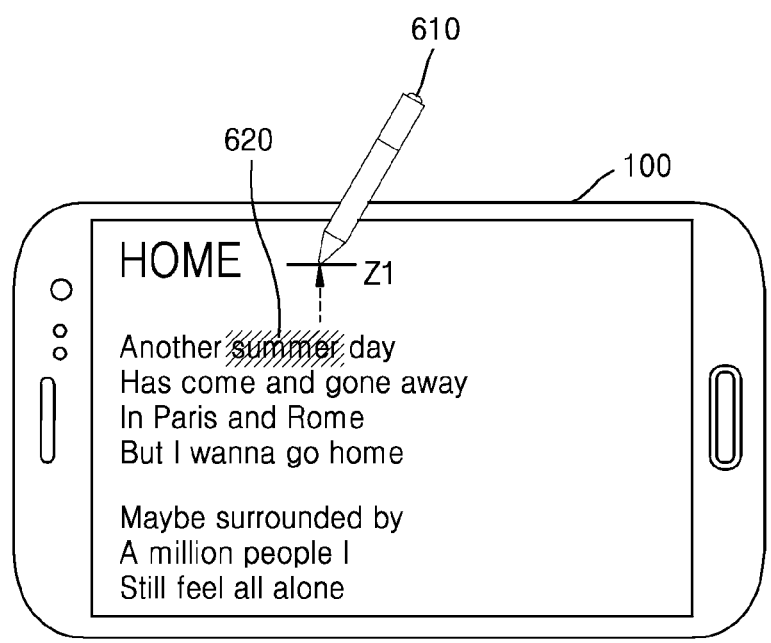
FIGS. 6A and 6B illustrates a detailed diagram for explaining in detail a method of determining an operation corresponding to a hovering input based on location information of a detected hovering inputter, which is performed by the device, according to an exemplary embodiment.

For example, referring to FIG. 6A, if the hovering inputter 610 hovers at a height z1 above a screen of the device 100 for a predetermined period of time, the device 100 may obtain a hovering input corresponding to location information z1. If location information of the hovering inputter 610 is z1, the device 100 may determine an operation corresponding to a hovering input in which location information is z1 in metadata regarding the document editing application. For example, the device 100 may determine an operation of cutting the target object 620 corresponding to a hovering input whose location information is z1. The device 100 may indicate the operation of cutting the target object 620 by changing a location of the target object 620.

Figure 6B:
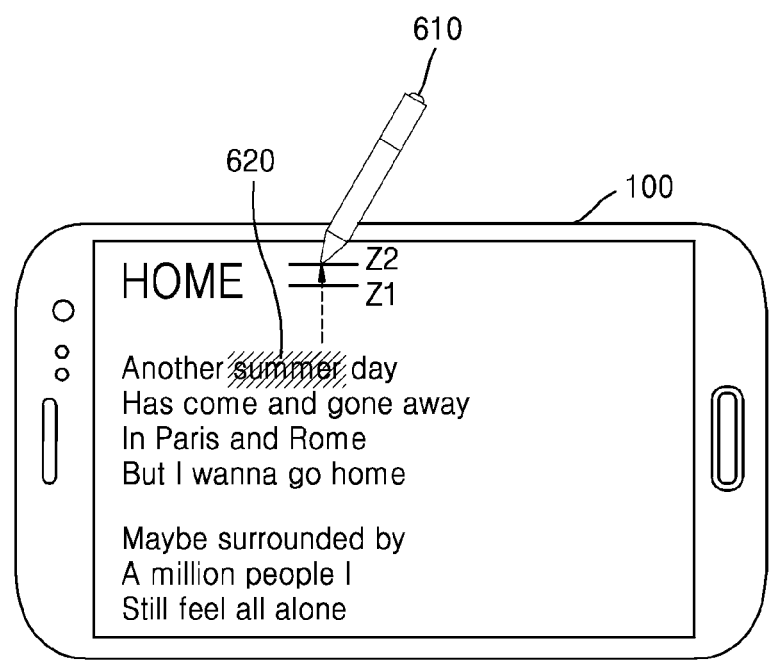

As another example, referring to FIG. 6B, if the hovering inputter 610 remains at a location at a height z2 above from the screen of the device 100 for a predetermined period of time, the device 100 may obtain a hovering input corresponding to location information z2. If location information of the hovering inputter 610 is z2, the device 100 may determine an operation corresponding to a hovering input whose location information is z2 in the metadata regarding the document editing application. For example, the device 100 may determine an operation of deleting the target object 620 corresponding to the hovering input in which the location information is z2.

Figure 7:
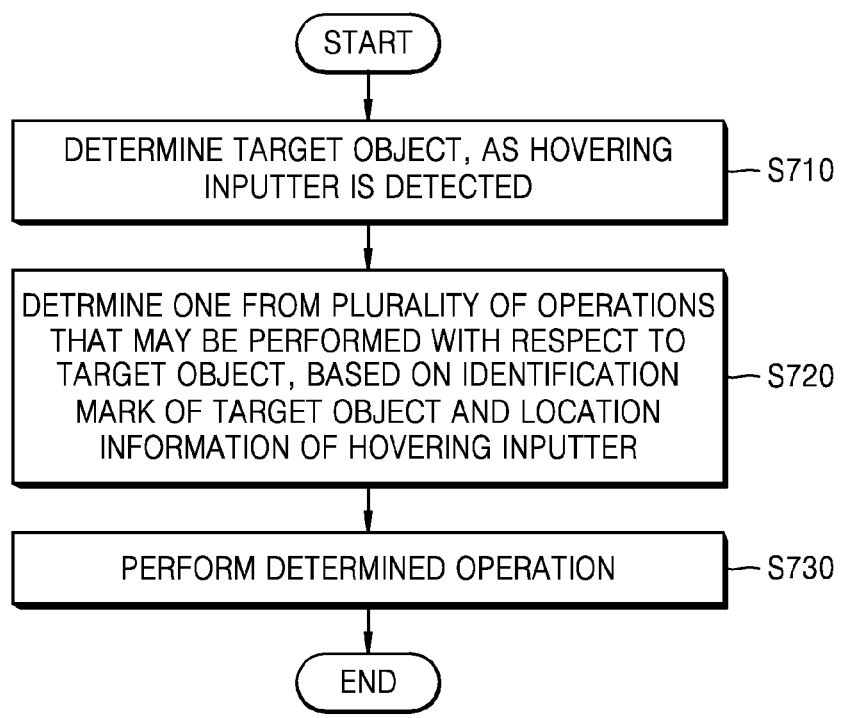
FIG. 7 illustrates a detailed diagram for explaining a method of determining an operation related to a target object based on an identification mark of the target object and location information of the hovering inputter, which is performed by the device, according to an exemplary embodiment.

FIG. 7 illustrates a detailed diagram for explaining a method of determining an operation related to the target object 20 based on an identification mark of the target object 20 and location information of the hovering inputter 10, which is performed by the device 100, according to an exemplary embodiment.

In operation S710, as the device 100 detects the hovering inputter 10, the device 100 determines the target object 20, from among at least one object displayed on the device 100. The target object 20 may be distinguished from other objects by using an identification mark generated by a user.

Operation S710 may, for example, correspond to operation 210 described with reference to FIG. 2.

In operation S720, the device 100 may determine one of a plurality of operations that may be performed with respect to the target object 20, based on an identification mark of the target object 20 and location information of the hovering inputter 10.

The device 100 may determine an operation related to the target object 20, by combining a type of the identification mark of the target object 20 and the location information of the hovering inputter 10. For example, the device 100 may determine a type of an operation related to the target object 20, based on the identification mark of the target object 20. If the identification mark of the target object 20 is a first image, the device 100 may select an operation of changing a size of the target object 20. Additionally, if the identification mark of the target object 20 is a second image, the device 100 may select an operation of changing a color of the target object 20.

The device 100 may determine a particular operation with respect to a type of the determined operation by using location information of the hovering inputter 10. For example, if the device 100 selects an operation of resizing the target object 20, the device 100 may choose the new size of the target object 20 according to the location information of the hovering inputter 10. An example of this will be described in detail below with reference to FIG. 8.

As another example, if the device 100 selects an operation of changing a color of the target object 20, the device 100 may choose the new color of the target object 20 according to location information of the hovering inputter 10. An example of this will be described in detail below with reference to FIG. 9.

In operation S730, the device 100 may perform the determined operation.

The device 100 may change content displayed on a screen according to a user input, and perform the determined operation on the target object 20. An example of this is described in detail below with reference to FIGS. 13 through 15.

Figure 8A:
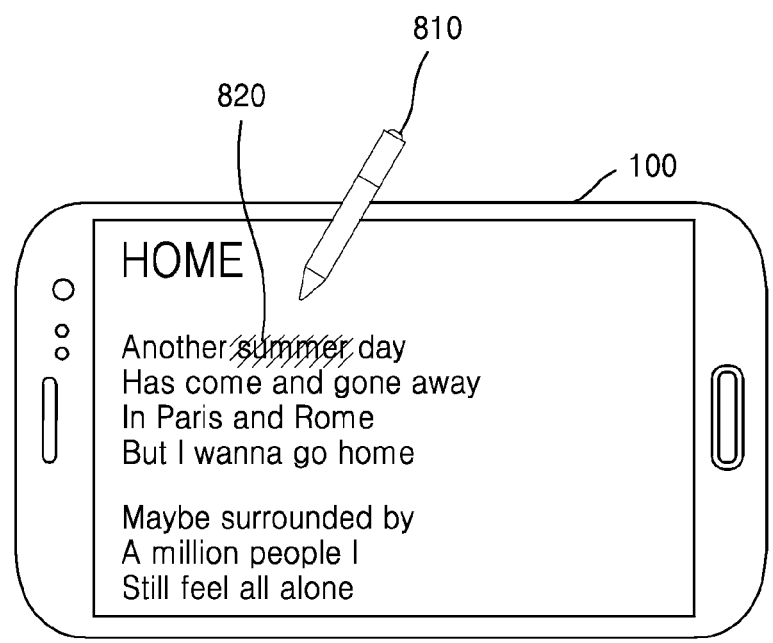
FIGS. 8A through 8C illustrate diagrams for explaining a method of changing a color of a target object based on an identification mark of the target object and location information of the hovering inputter, which is performed by the device, according to an exemplary embodiment.
Figure 8B:
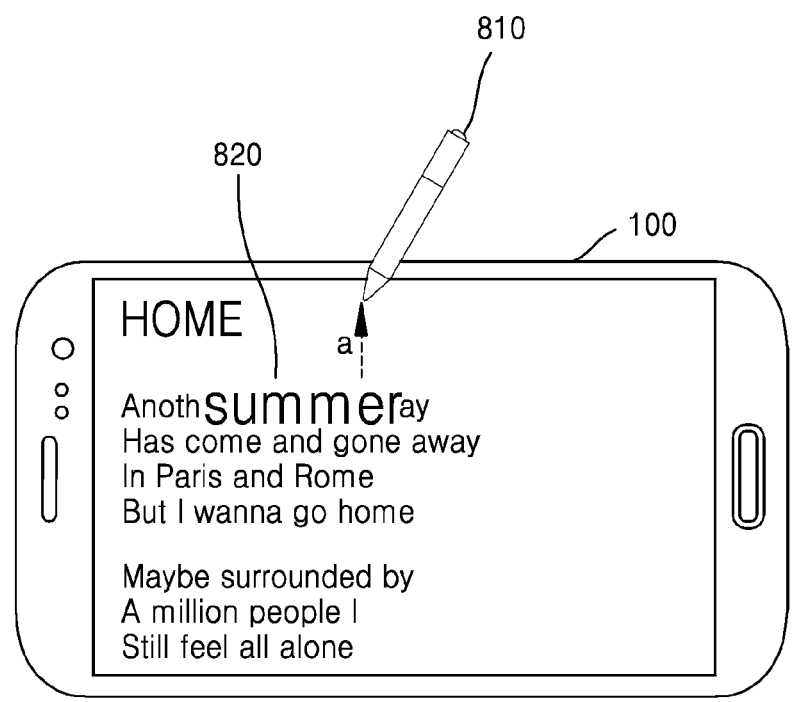
Figure 8C:
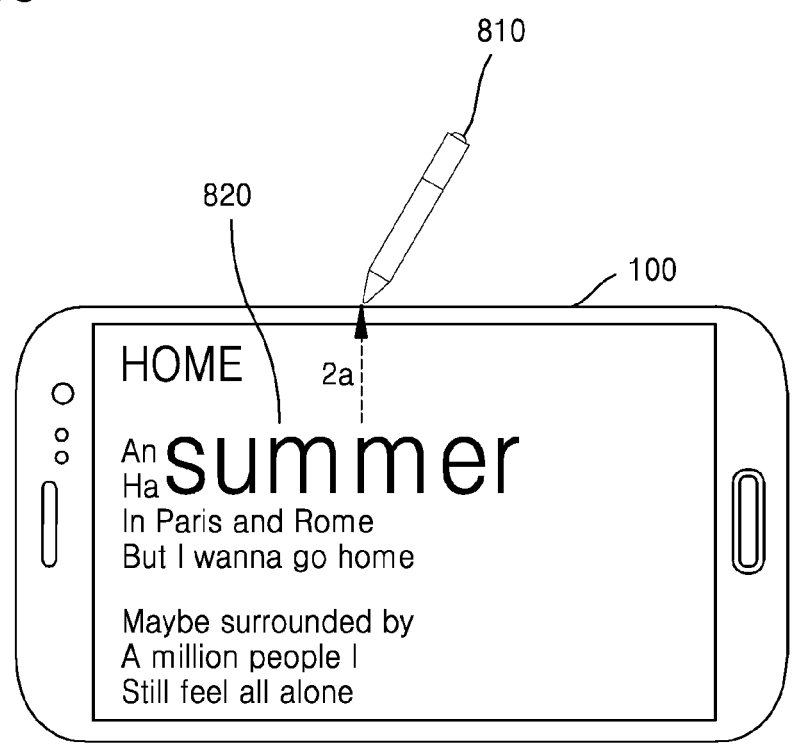

FIGS. 8A through 8C illustrate diagrams for explaining a method of changing a color of a target object 820 based on an identification mark of the target object 820 and location information of a hovering inputter 810, the changing being performed by the device 100, according to an exemplary embodiment.

Referring to FIGS. 8A through 8C, a document editing application may be executed on the device 100. The device 100 may detect the target object 820 that includes an identification mark of an image consisting of a plurality of diagonal lines (hereinafter, referred to as a first image), from among at least one object displayed on a screen. The device 100 may determine an operation from among a plurality of operations predetermined with respect to the target object 820, by combining the identification mark of the first image and the location information of the hovering inputter 810.

Referring to FIG. 8A, the device 100 may determine a type of an operation related to the target object 820, by using the identification mark of the first image. For example, the device 100 may obtain information, which indicates that a type of an operation corresponding to the identification mark of the first image is an operation of changing a size of the target object 820, from metadata regarding the document editing application.

Referring to FIGS. 8B and 8C, the device 100 may determine a particular operation with respect to the determined type of the operation, by using the location information of the hovering inputter 810. In FIG. 8B, if a location of the hovering inputter 810 related to the target object 820 that includes an identification mark of the first image is a, the device 100 may execute a resizing operation of doubling the size of the target object 820. As another example, in FIG. 8C, if a location of the hovering inputter 820 is 2a, the device 100 may execute a resizing operation of quadrupling the size of the target object 820.

Figure 9A:
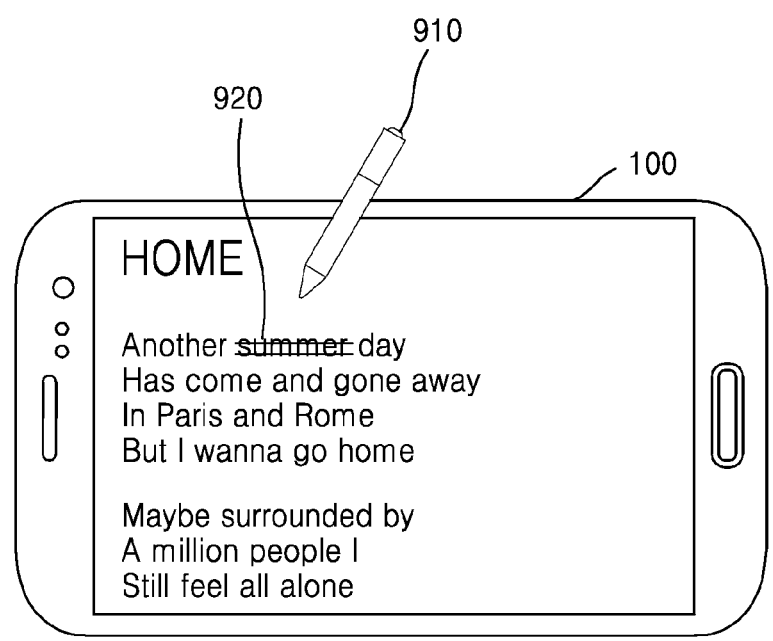
FIGS. 9A through 9C illustrate diagrams for explaining a method of changing a color of a target object based on an identification mark of the target object and location information of the hovering inputter, which is performed by the device, according to an exemplary embodiment.
Figure 9B:
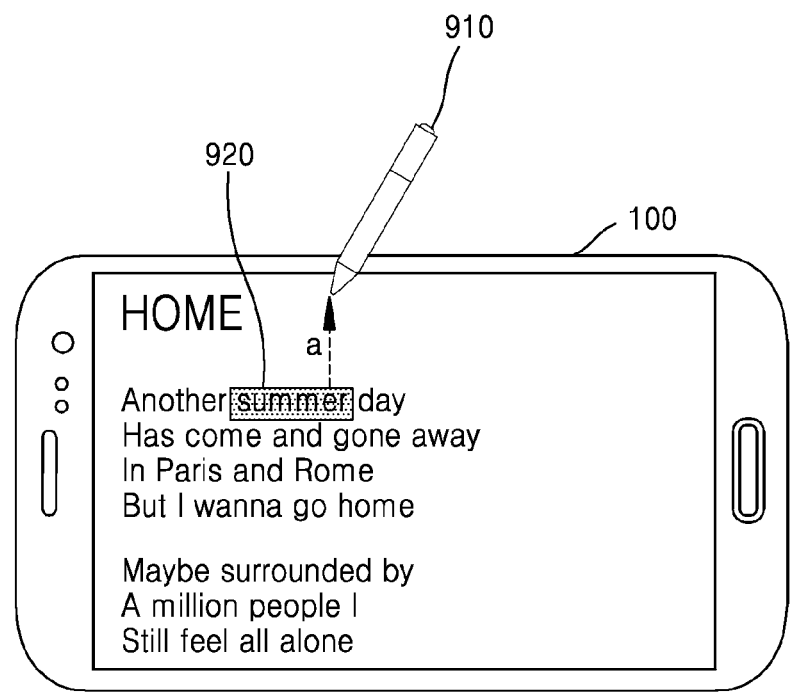
Figure 9C:
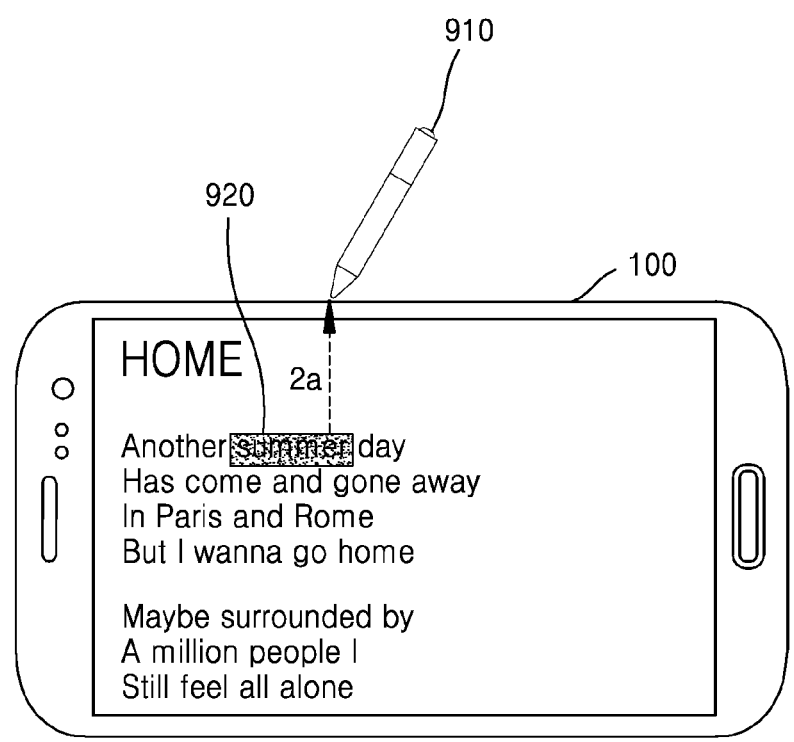

FIGS. 9A through 9C illustrate diagrams for explaining a method of changing a color of a target object 920 based on an identification mark of the target object 920 and location information of a hovering inputter 910, which is performed by the device 100, according to an exemplary embodiment.

Referring to FIGS. 9A through 9C, the device 100 may execute a document editing application. The device 100 may detect the target object 920 that includes an identification mark of an image consisting of a plurality of horizontal lines (hereinafter, referred to as a second image), from among at least one object displayed on a screen. The device 100 may determine an operation from among a plurality of operations predetermined with respect to the target object 920, by combining the identification mark of the second image and location information of the hovering inputter 910.

Referring to FIG. 9A, the device 100 may determine a type of an operation related to the target object 920, by using the identification mark of the second image. For example, the device 100 may obtain information, which indicates that a type of an operation corresponding to the identification mark of the second image is an operation of changing a color of the target object 920, from metadata regarding the document editing application.

Additionally, the device 100 may determine a particular operation with respect to the determined type, by using the location information of the hovering inputter 910.

Referring to FIG. 9B, if a location of the hovering inputter 910 related to the target object 920 that includes the identification mark of the second image is a, the device 100 may, for example, determine an operation of changing a color of the target object 920 to blue.

As another example, referring to FIG. 9C, if a location of the hovering inputter 920 is 2a, the device 100 may determine an operation of changing a color of the target object 820 to green.

Figure 10:
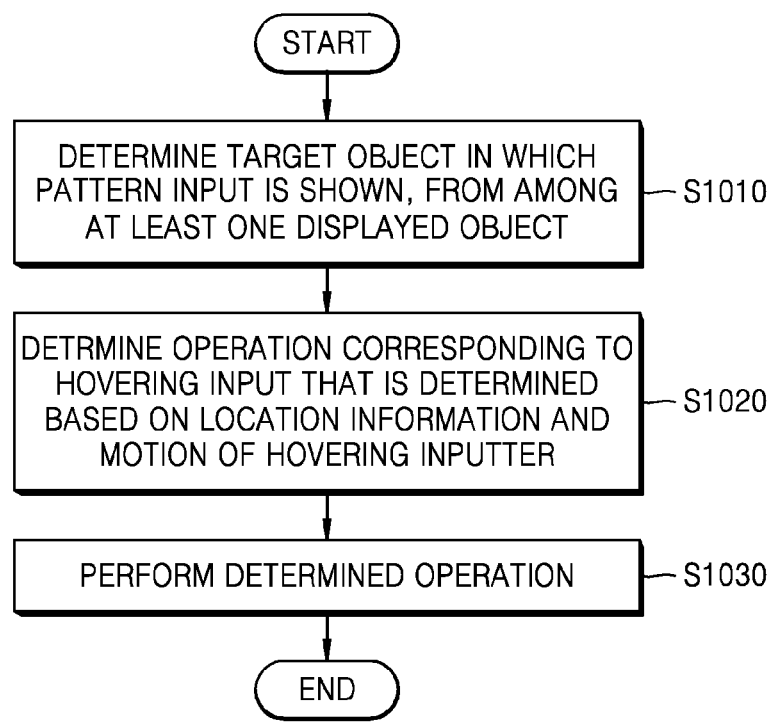
FIG. 10 illustrates a diagram for explaining a method of determining an operation related to a target object by using location information of the hovering inputter and movement of the hovering inputter, the determining being performed by the device, according to an exemplary embodiment.

FIG. 10 illustrates a diagram for explaining a method of determining an operation related to the target object 20 by using location information of the hovering inputter 10 and movement of the hovering inputter 10, the determining being performed by the device 100, according to an exemplary embodiment.

In operation S1010, as the device 100 detects the hovering inputter 10, the device 100 determines the target object 20, from among at least one object displayed on the device 100. The target object 20 may be distinguished from other objects by using an identification mark generated by a user.

Operation 1010 may, for example correspond to operation 210 described with reference to FIG. 2.

In operation S1020, the device 100 may determine an operation corresponding to a hovering input that is determined based on location information of the hovering inputter 10 and movement of the hovering inputter 10.

The device 100 may determine one from among a plurality of operations that may be performed with respect to the target object 20, by combining the location information of the hovering inputter 10 with movement of the hovering inputter 10.

According to an exemplary embodiment, the device 100 may determine a type of an operation related to the target object 20, based on the movement of the hovering inputter 10. The type of the operation related to the target object 20 may be determined based on at least one of a direction in which the hovering inputter 10 moves and a type of movement of the hovering inputter 10. If the hovering inputter 10 moves sequentially to the right and then downward, the device 100 may determine an operation of moving the target object 20 to the right.

The device 100 may determine a particular operation with respect to the determined type by using the location information of the hovering inputter 10. For example, if the device 100 moves sequentially to the right and then downward, the device 100 may determine a distance for which the target object 20 is to be moved to the right at a height of the device 100.

According to another exemplary embodiment, the device 100 may determine a type of an operation related to the target object 20, based on location information of the hovering inputter 10. If the hovering inputter 10 remains at a location where the hovering inputter 10 is at a height z1 above the device 100 for a predetermined period of time, the device 100 may determine an operation of changing the color of the target object 20.

The device 100 may determine a particular operation with respect to the determined type of operation, based on movement of the hovering inputter 10. For example, if the hovering inputter 10 moves to the right, the device 100 may determine a color of the target object 10 according to a distance for which the device 100 is moved.

In operation S1030, the device 100 may perform the determined operation.

The device 100 may perform an operation determined with respect to the target object 20, by changing content displayed on a screen according to a user input.

Figure 11A:
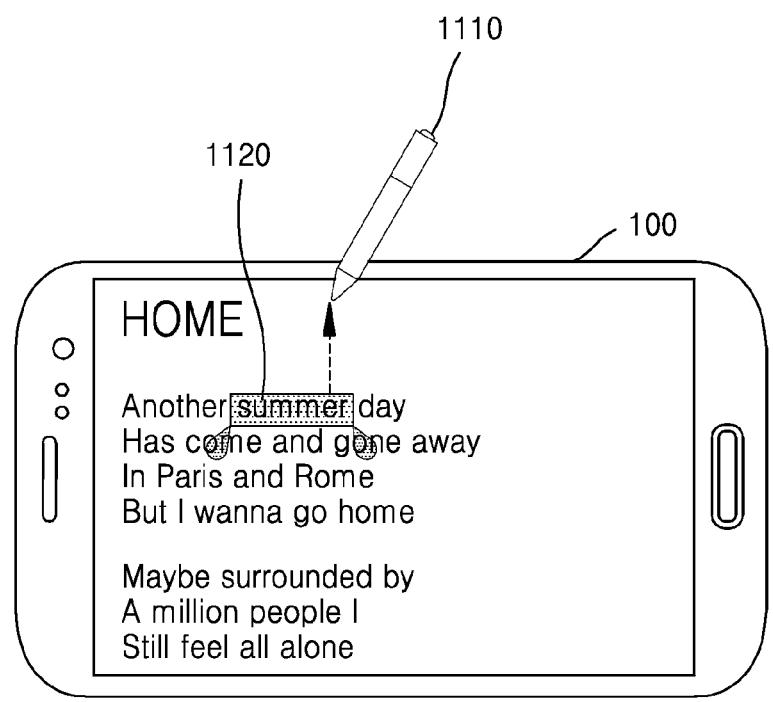
FIGS. 11A through 11C illustrate diagrams for explaining a method of determining an operation for changing a location of a target object by using location information of the hovering inputter and movement of the hovering inputter, the determining being performed by the device, according to an exemplary embodiment.
Figure 11B:
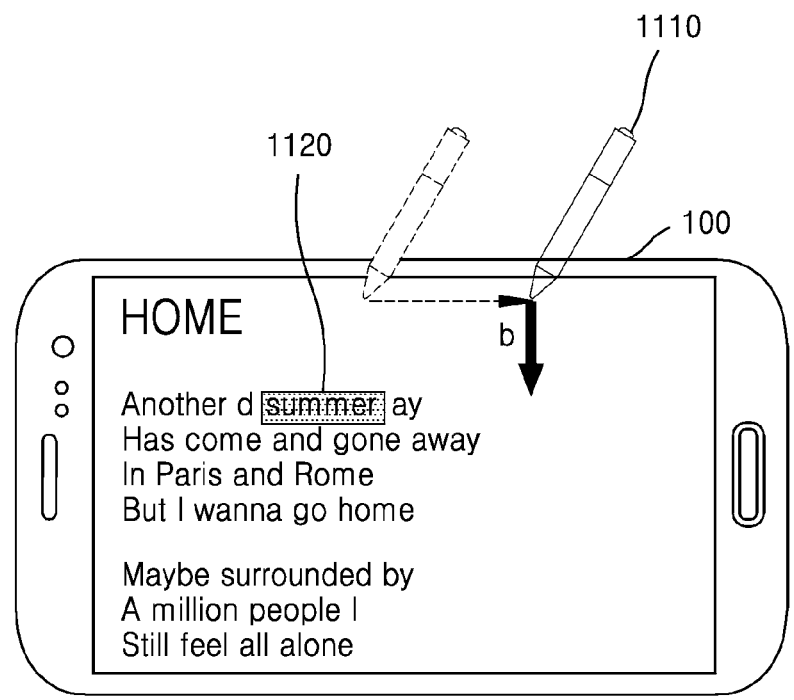
Figure 11C:
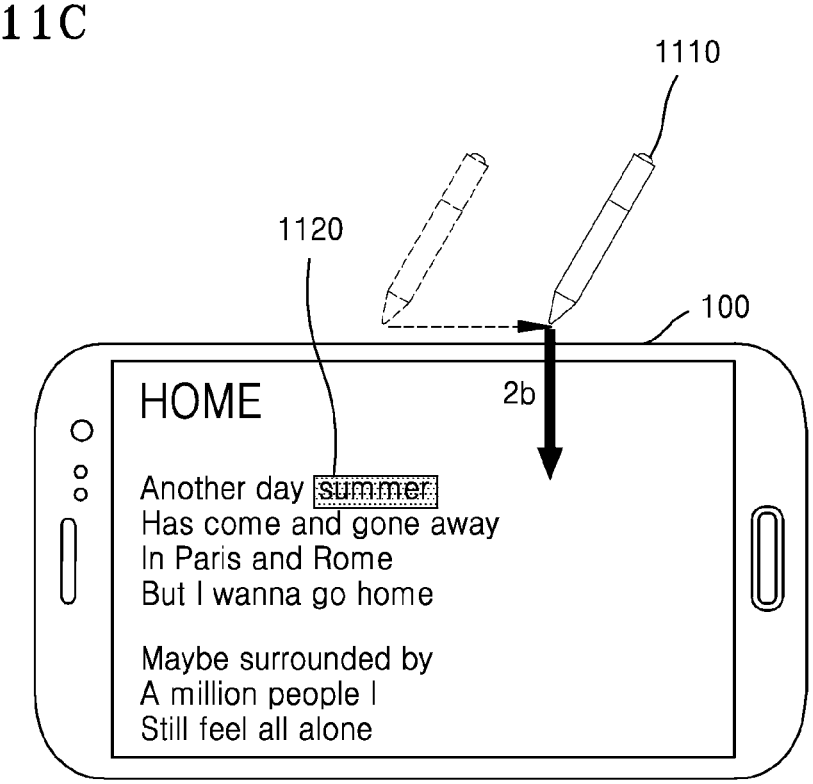

FIGS. 11A through 11C illustrate diagrams for explaining a method of determining an operation of changing a location of a target object 1120, by using location information of the hovering inputter 10 and movement of the hovering inputter 10, the determining being performed by the device 100, according to an exemplary embodiment.

Referring to FIG. 11, the device 100 may execute a document editing application. The device 100 may detect a target object 1120 that includes an identification mark, from among at least one object displayed on a screen.

The device 100 may determine an operation from among a plurality of predetermined operations that may be performed with respect to the target object 1120, by combining location information of the hovering inputter 10 and movement of the hovering inputter 10.

For example, the device 100 may determine a type of an operation related to the target object 1120, based on at least one selected from the group consisting of a direction in which the hovering inputter 10 moves and a form of movement of the hovering inputter 10. In FIG. 11, if the hovering inputter 10 moves sequentially to the right and a downward direction, the device 100 may determine an operation of moving a location of the target object 1120 to the right.

The device 100 may determine a distance for which the target object 1120 is moved to the right, based on location information of the hovering inputter 10. For example, referring to FIG. 11B, if location information of the hovering inputter 10 is b, the device 100 may move the target object 1120 to the right in correspondence with a first unit distance. If the target object 20 is a word included in text data, the first unit distance may be one character. For example, the device 100 may insert the target object 1120 between letters of a word located to the right of the target object 1120, and thus, move the target object 1120 to the right.

As another example, referring to FIG. 11C, if location information of the hovering inputter 10 is 2b, the device 100 may move the target object 1120 to the right in correspondence with a second unit distance. If the target object 1120 is a word included in text data, the second unit distance may be one word. For example, the device 100 may move the target object 1120 to the right by interchanging a word located to the right of the target object 1120 with the target object 1120.

Figure 12A:
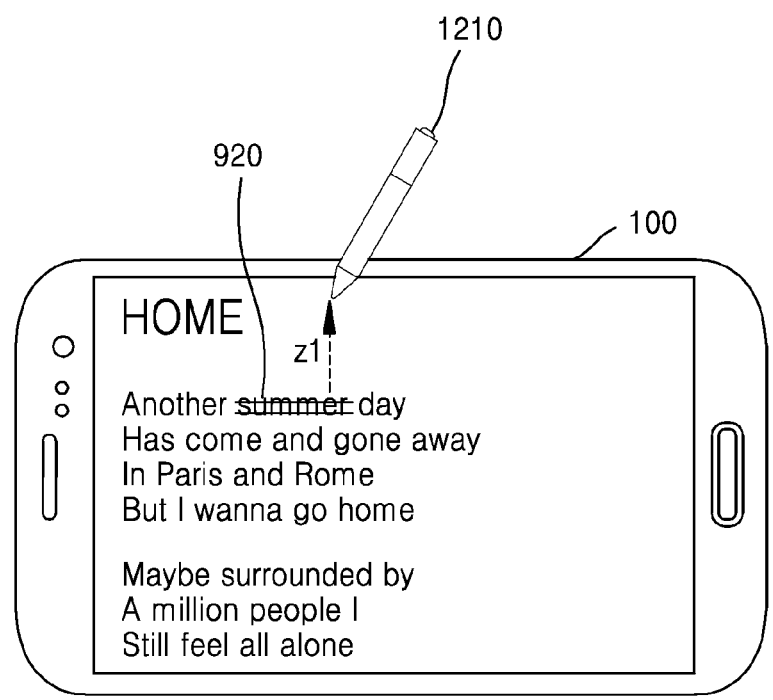
FIGS. 12A through 12C illustrate diagrams for explaining a method of determining an operation for changing a color of a target object by using location information of the hovering inputter and movement of the hovering inputter, the determining being performed by the device, according to an exemplary embodiment.
Figure 12B:
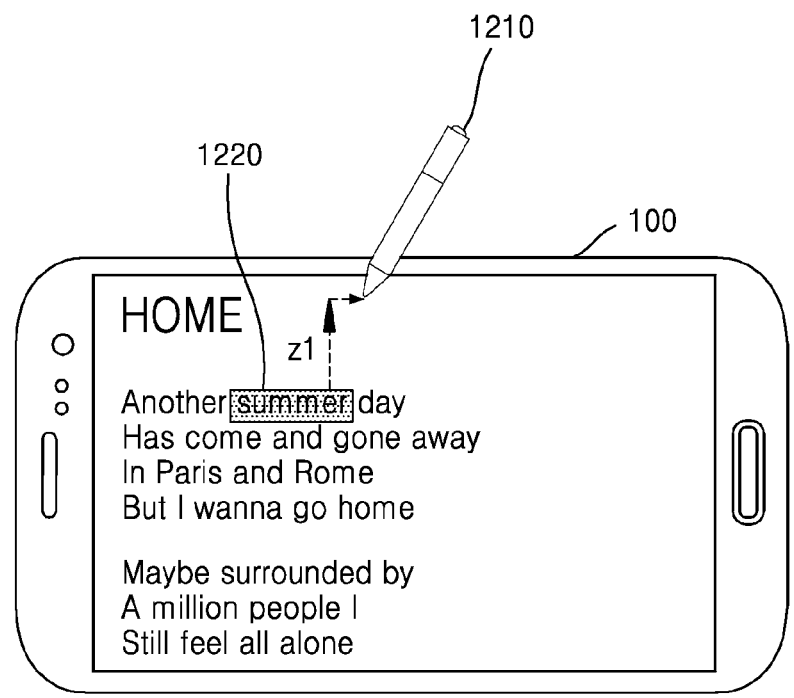
Figure 12C:
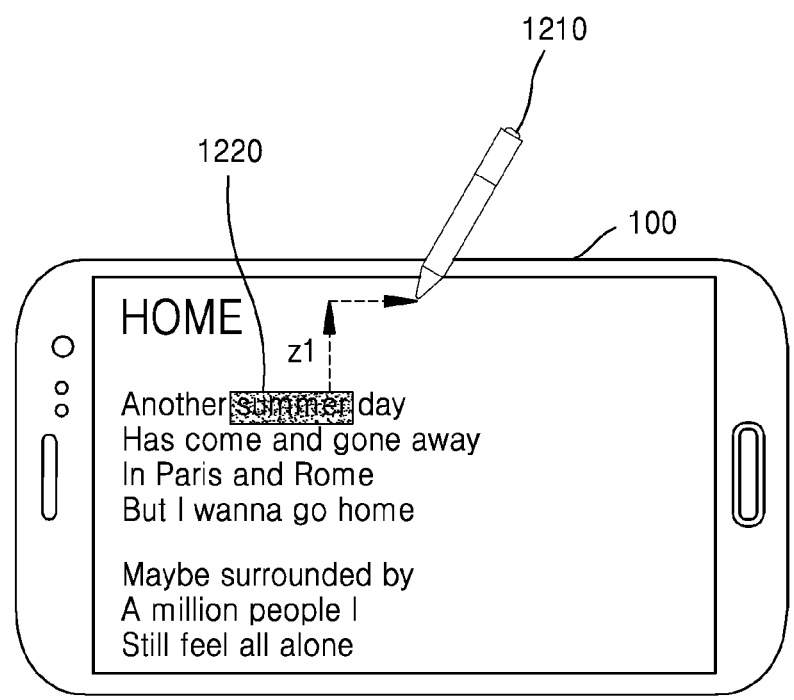

FIGS. 12A through 12C illustrate diagrams for explaining a method of determining an operation of changing a color of the target object 20 by using location information of the hovering inputter 10 and movement of the hovering inputter 10, the determining being performed by the device 100, according to an exemplary embodiment.

The device 100 may determine one of a plurality of predetermined operations that may be performed with respect to the target object 20, by combining the location information of the hovering inputter 10 with movement of the hovering inputter 10.

For example, referring to FIG. 12A, if the hovering inputter 10 remains in a location at a height z1 above from the device 100 for a predetermined period of time, the device 100 may determine an operation of changing a color of the target object 20.

The device 100 may determine a particular operation with respect to a type of the determined operation, based on movement of the hovering inputter 10. If the hovering inputter 10 moves to the right, the device 100 may determine a color of the target object 10 according to a distance for which the device 100 is moved.

For example, referring to FIG. 12B, if the hovering inputter 910 moves to the right in correspondence with a first unit distance, the device 100 may change a color of the target object 920 to blue. As another example, referring to FIG. 12C, if the hovering inputter 910 moves to the right in correspondence with a second unit distance, the device 100 may change a color of the target object 920 to green.

Figure 13:
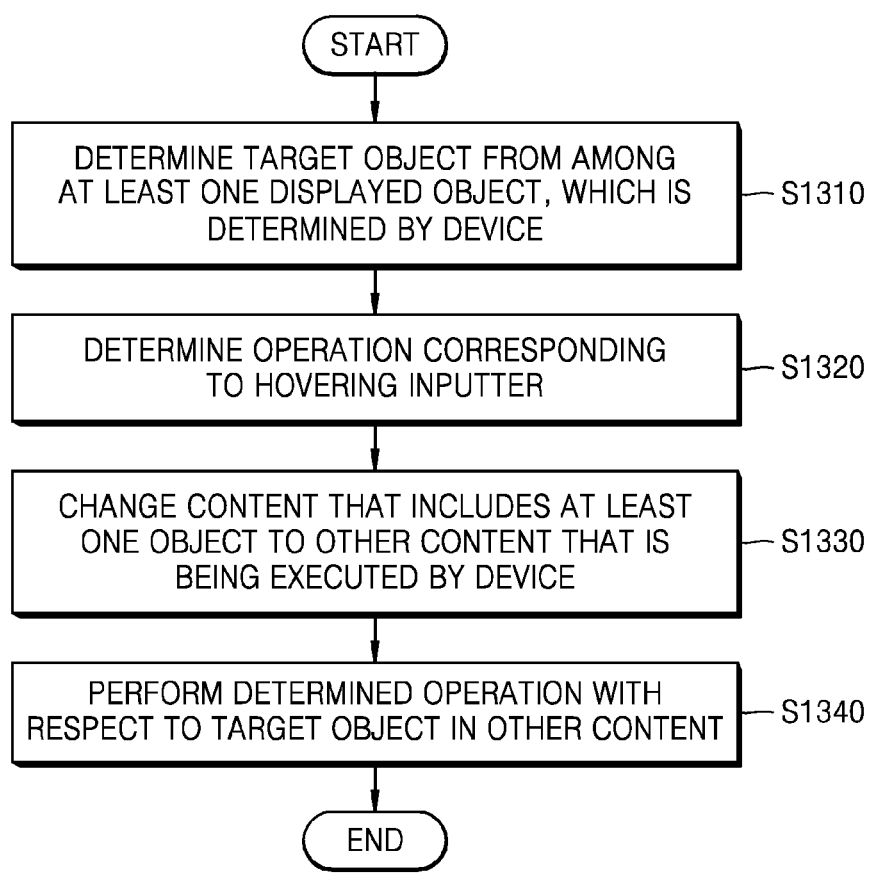
FIG. 13 illustrates a flowchart of a method of determining content in which an operation related to a target object is performed, the determining being performed by the device, according to an exemplary embodiment.

FIG. 13 illustrates a flowchart of a method of determining content in which an operation related to the target object 10 is performed, the determining being performed by the device 100, according to an exemplary embodiment.

In operation S1310, as the device 100 detects the hovering inputter 10, the device 100 determines the target object 20, from among at least one object displayed on the device 100. The target object 20 may be distinguished from other objects by using an identification mark generated by a user.

In operation S1320, the device 100 may determine an operation corresponding to a hovering input that is determined based on location information of the hovering inputter 10 detected by the device 100, from among a plurality of predetermined operations that may be performed with respect to the target object 20. The device 100 may identify a hovering input based on the location information of the hovering inputter 10. According to an exemplary embodiment, the device 100 may determine an operation corresponding to the identified hovering input, by using metadata regarding an application that is being executed by the device 100.

Operation S1320 may, for example, correspond to operation 220 described with reference to FIG. 2.

In operation S1330, the device 100 may change content that is displayed on a screen and includes at least one object to other content that is being executed by the device 100, based on a user input. A user input may include a touch input or a hovering input. However, this is only an exemplary embodiment, and a user input is not limited thereto.

According to an exemplary embodiment, if the device 100 receives a second hovering input, the device 100 may move the target object 20 to other content. For example, when executing a digital book application, if the device 100 receives the second hovering input, the device 100 may move the target object 20 from a page that includes the target object 20 to a different page. As another example, the device 100 may move the target object 20 included in content to other content that is output when another application is executed. As the second hovering input is obtained, the device 100 may move the target object 20, included in first content that is output when a first web browser application is executed, to second content that is output when a second web browser application is executed.

The device 100 may determine the other content to which the target object 20 is to be moved, based on one of movement of the second hovering input and location information of the second hovering input. An example of this is described in detail below with reference to FIGS. 14 and 15.

If the device 100 moves the target object 100 to the other content, the device 100 may change and display a location of the target object 10 in correspondence with movement of the hovering inputter 10. A user may identify the location to which the target object 10 is to be moved, and intuitively move the target object 10 to the other content.

In operation S1340, the device 100 may perform the determined operation with respect to the target object 20, in the content to which the target object 10 moved. For example, if the determined operation with respect to the target object 20 includes operations of cutting and pasting the target object 20, the device 100 may cut the target object 20 from content that includes the target object 20, and then, pasting the target object 20 to the content to which the target object 20 is to be moved.

Figure 14A:
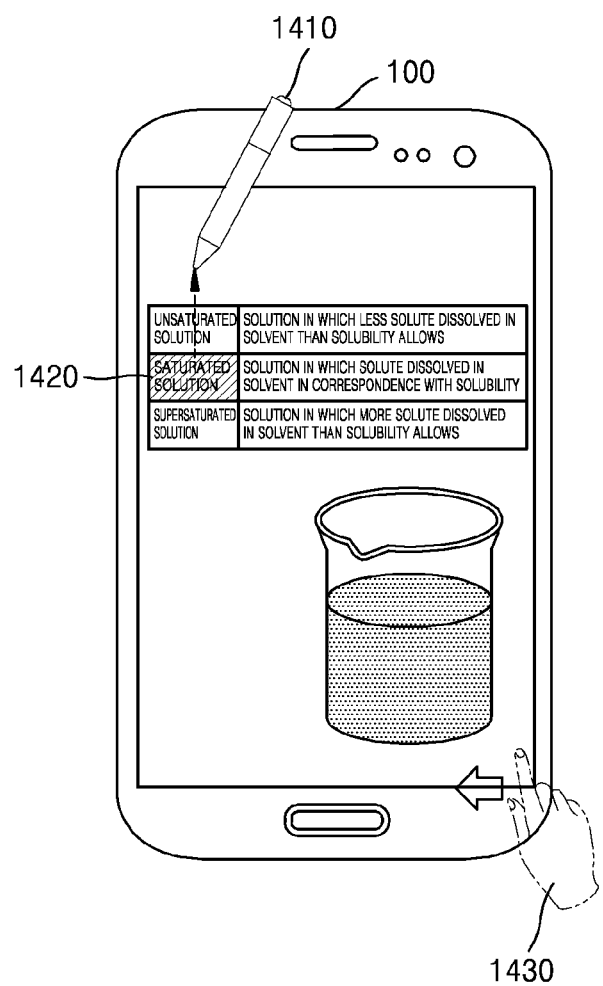
FIGS. 14A through 14B illustrate diagrams for explaining in detail a method of determining content in which an operation related to a target object is performed, the determining being performed by the device, according to an exemplary embodiment.
Figure 14B:
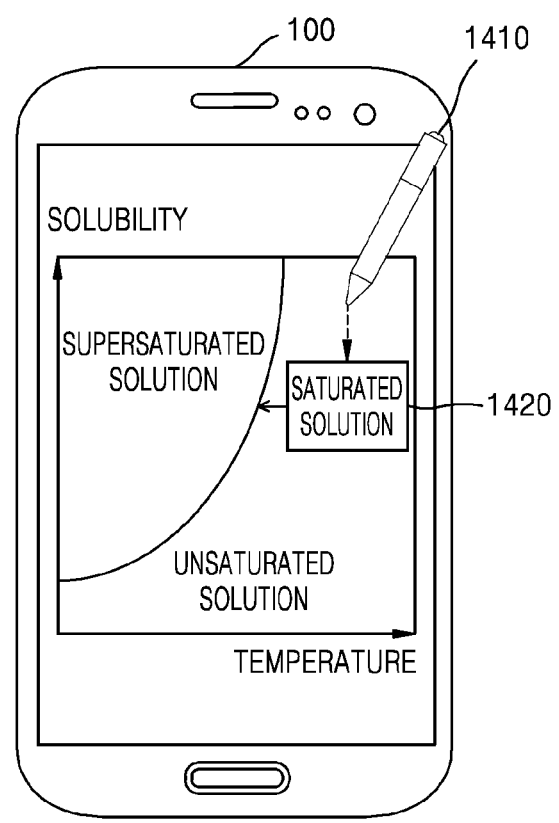

FIGS. 14A through 14B illustrate diagrams for explaining in detail a method of determining content in which an operation related to a target object 1420 is performed, the determining being performed by the device 100, according to an exemplary embodiment.

Referring to FIG. 14, the device 100 may execute a digital book playback application. As the device 100 detects the hovering inputter 1410, the device 100 determines the target object 1420, from among at least one object displayed on the device 100. The target object 1420 may be distinguished from other objects by using an identification mark generated by a user.

The device 100 may determine an operation corresponding to a hovering input that is determined based on location information of the hovering inputter 1410 detected by the device 100, from among a plurality of predetermined operations that may be performed with respect to the target object 1420. The device 100 may determine an operation of cutting and pasting the target object 1420, based on the location information of the hovering inputter 1410.

If the device 100 receives a user input 1430, the device 100 may display content on a screen of the device 100 which is different than content previously displayed thereon. For example, when the device 100 receives the user input 1430, the device 100 may display, on the screen, a second page that includes the target object 1420, instead of a first page that includes the target object 1420.

The device 100 may perform the determined operation on the target object 1420 included in the different content. For example, when the device 100 receives the user input 1430, the device 100 may display the second page on the screen and paste the target object 1420 to a location on the second page corresponding to a location of the hovering inputter 1410.

Figure 15A:
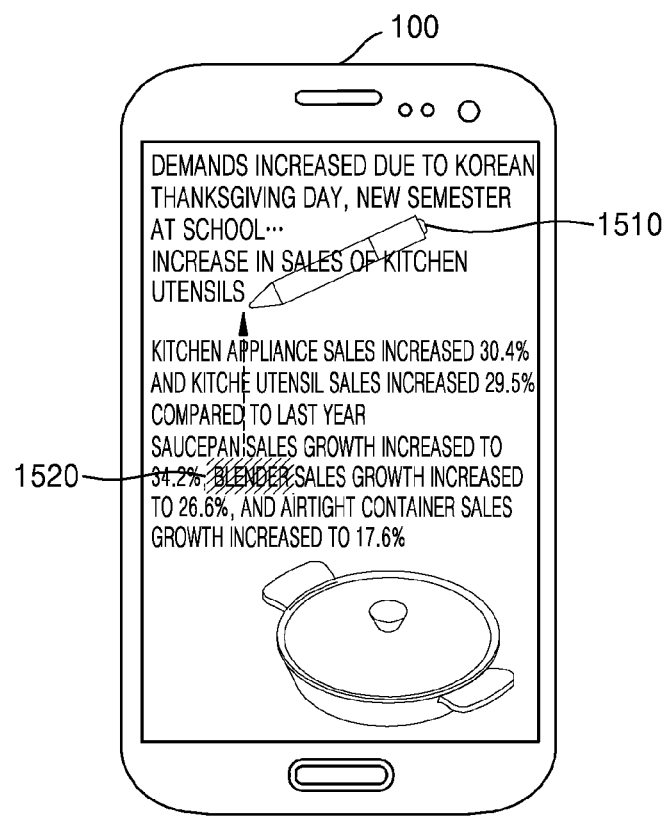
FIGS. 15A through 15C illustrate diagrams for explaining in detail a method of determining content in which an operation related to a target object is performed, the determining being performed by the device, according to another exemplary embodiment.
Figure 15B:
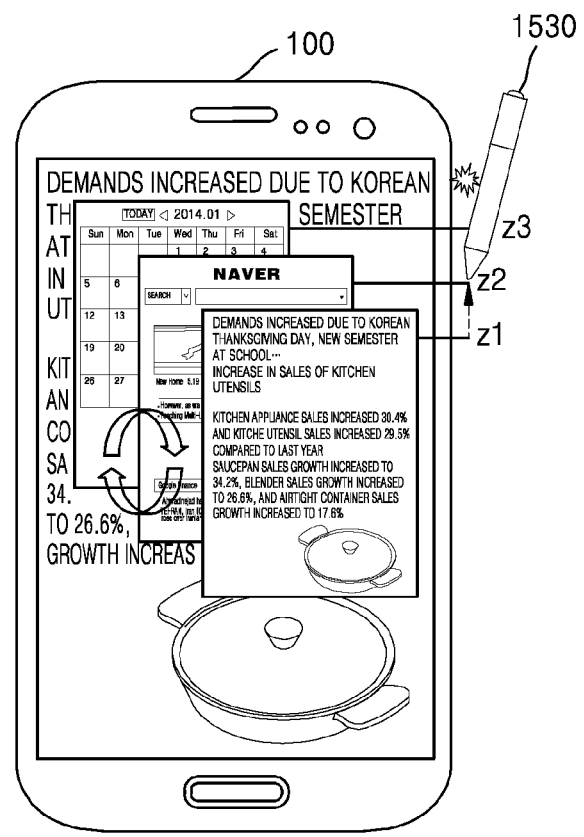
Figure 15C:
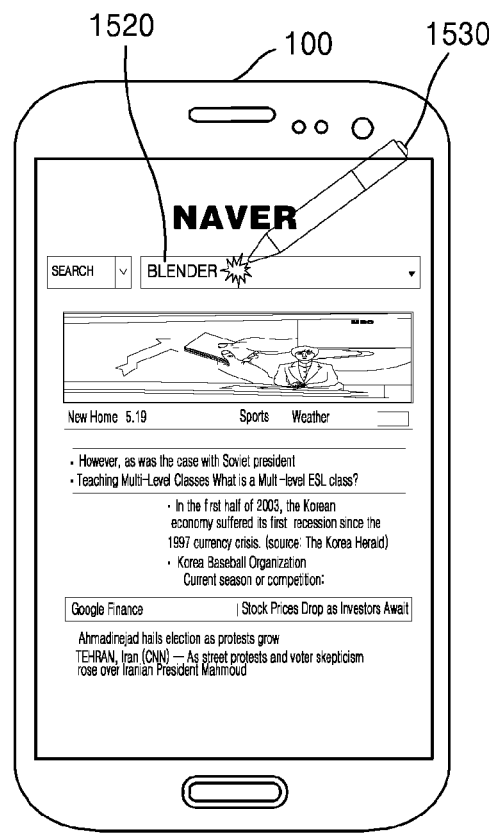

FIGS. 15A through 15C illustrate diagrams for explaining in detail a method of determining content in which an operation related to a target object 1510 is performed, the determining being performed by the device 100, according to another exemplary embodiment.

Referring to FIG. 15, the device 100 may execute a plurality of web browser applications. As the device 100 detects the hovering inputter 1510, the device 100 determines a target object 1520, from among at least one object displayed on the device 100. The target object 1520 may be distinguished from other objects by using an identification mark generated by a user.

The device 100 may determine an operation corresponding to a hovering input that is determined based on location information of the hovering inputter 10 detected by the device 100, from among a plurality of predetermined operations that may be performed with respect to the target object 1520. For example, the device 100 may determine an operation of cutting and pasting the target object 1520, based on the location information of the hovering inputter 1510.

When the device 100 receives a user input, the device 100 may display different content on the screen. For example, the device 100 may receive a second hovering input for displaying content on a screen of the device 100 which is different than content previously displayed thereon. If the device 100 receives the second hovering unit, the device 100 may select content which is different from the content previously displayed thereon, based on at least one selected from the group consisting of movement of the second hovering input and location information of the second hovering input. For example, referring to FIG. 15B, the device 100 may select one from among respective pieces of contents of the plurality of applications executed by the device 100, based on location information of the second hovering input. If the location information of the second hovering input is z2, as the device 100 obtains a user input, the device 100 may change a web page of a first web browser application that includes the target object 1520 displayed on a screen to a web page of a second web browser application corresponding to the location information z2.

The device 100 may perform the determined operation on the target object 1520 included in the different content. For example, referring to FIG. 15C, as a user input is obtained, the device 100 may perform an operation of pasting the target object 1520 to the web page of the second web browser application.

Figure 16:
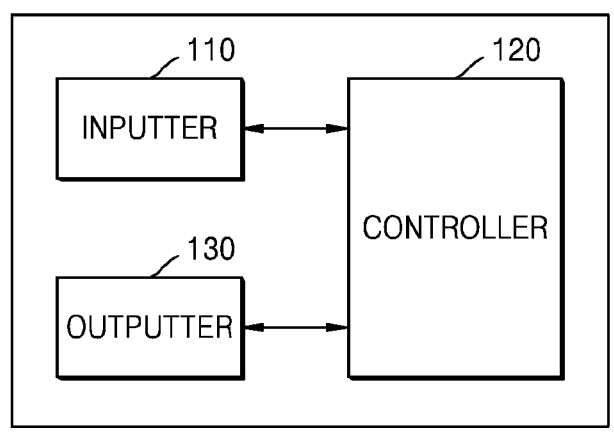
FIGS. 16 and 17 illustrate block diagrams of the device, according to an exemplary embodiment.
Figure 17:
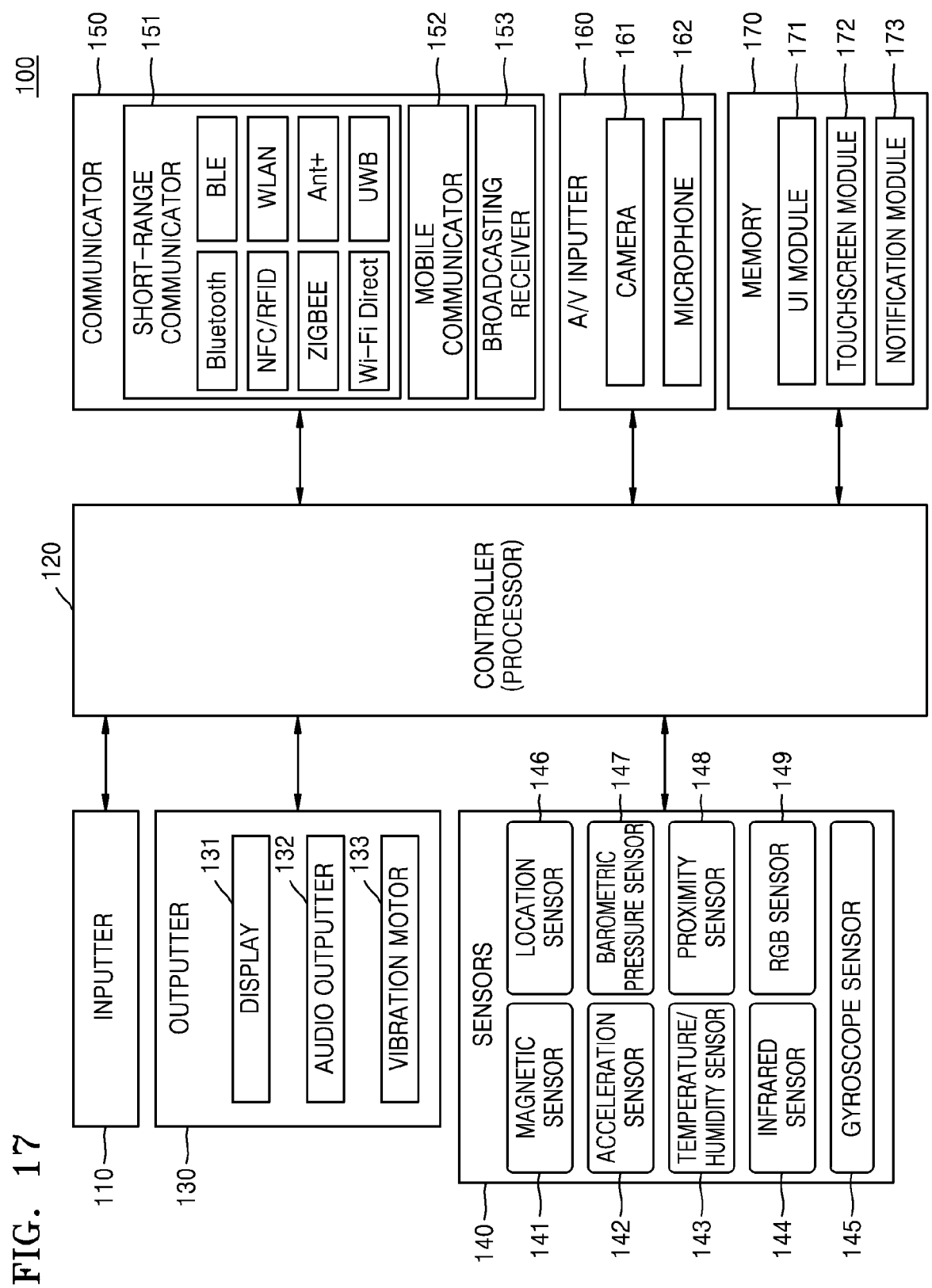

FIGS. 16 and 17 illustrate block diagrams of the device 100, according to an exemplary embodiment.

As shown in FIG. 16, according to an exemplary embodiment, the device 100 may include an inputter 110, a controller 120, and an outputter 130. However, the elements, shown in FIG. 16, are not essential elements. The device 100 may be implemented by using more or less elements than those shown in FIG. 16.

For example, as shown in FIG. 17, according to an exemplary embodiment, the device 100 may include sensors 140, a communicator 150, an audio-video (A/V) inputter 160, and a memory 170, in addition to the inputter 110, a controller 120, and an outputter 130.

Hereinafter, the units shown in FIGS. 16 and 17 are described.

The inputter 110 may be a unit for inputting data so that the user may control the device 100. For example, the inputter 110 may include a key pad, a dome switch, a touch pad (which may be a capacitive overlay type, a resistive overlay type, an infrared beam type, a surface acoustic wave type, an integral strain gauge type, or a piezo electric type), a jog wheel, or a jog switch, but is not limited thereto.

The inputter 110 may obtain various types of user inputs. For example, the inputter 110 may obtain a hovering input, which is based on a method of changing a capacitance detected by the device 100, from a user. Additionally, the inputter 110 may obtain a user input of changing content, which is displayed on the device 100 and includes at least one object, to another content executed by the device 100.

The controller 120 generally controls all operations of the device 100. For example, the controller 120 executes programs stored in the memory 170 so as to control the inputter 110, the outputter 130, the sensors 140, the communicator 150, and the A/V inputter 160.

As the hovering inputter 10 for generating a hovering input is detected, the controller 120 may determine the target object 20, from among at least one object displayed on the device 100. For example, the controller 120 may determine an object that includes an identification mark, from among at least one object located within a predetermined range of distance from a location in which the hovering inputter 10 is detected, as a target object.

The controller 120 may determine an operation corresponding to a hovering input determined based on location information of the hovering inputter 10 detected by the device 10, from among a plurality of predetermined operations that may be performed with respect to the target object 20.

According to another exemplary embodiment, the controller 120 may determine at least one operation selected from the group consisting of a plurality of predetermined operations that may be performed with respect to the target object 20, based on an identification mark of the target object 20 and location information of the hovering inputter 10.

According to another exemplary embodiment, the controller 120 may determine a type of an operation corresponding to a hovering input based on location information of the hovering inputter 10, and determine a particular operation with respect to the determined type of the operation based on movement of the hovering inputter 10.

If a second hovering input is obtained as a user input of changing content from the inputter 110, the controller 120 may select one from among a plurality of pieces of other contents, based second location information determined based on a distance between the hovering inputter 10 for generating the second hovering input and the device 100.

If location information of the hovering inputter is changed within a predetermined period of time from when the second hovering input is obtained, the controller 120 may re-determine an operation corresponding to a hovering input whose location information is changed.

The outputter 130 functions to output an audio signal, a video signal, or a vibration signal, and may include a display 131, an audio outputter 132, and a vibration motor 133.

The display 131 displays and outputs information processed by the device 100. The display 131 may output a result obtained when a determined operation is performed on the target object 20, based on an obtained hovering input.

The display 131 may display an identification mark on content selected by a user, from among at least one piece of content displayed on the device 100.

If the display 131 and a touch pad form a layered structure to constitute a touch screen, the display 131 may be also used as an input device as well as an outputter. The display 131 may include at least one selected from the group consisting of a liquid crystal display (LCD), a thin-film transistor-liquid crystal display (TFT-LCD), an organic light-emitting diode (OLED), a flexible display, a 3D display, and an electrophoretic display. According to an implementation type of the device 100, the device 100 may include two or more displays 131. Two or more displays 131 may be disposed to face each other by using a hinge.

The audio outputter 132 outputs audio data which is received from the communicator 150 or stored in the memory 170. The audio outputter 132 outputs an audio signal related to functions performed by the device 100 (for example, a call signal reception sound, a message reception sound, a notification sound, or the like). The sound outputter 132 may include a speaker, a buzzer, and so on.

The vibration motor 133 may output a vibration signal. For example, the vibration motor 133 may output a vibration signal which corresponds to an output of audio data or video data (for example, a call signal reception sound, a message reception sound, or the like). Additionally, the vibration motor 133 may output a vibration signal if a touch is input to a touchscreen.

The sensors 140 may sense a status of the device 100 or a status near the second device 100, and transmit information, obtained from the sensing, to the controller 120. For example, the sensors 140 may sense a reference operation by a user with respect to review content 105 and transmit information, obtained from the sensing, to the controller 120.

The sensors 140 may include at least one selected from the group consisting of a magnetic sensor 141, an acceleration sensor 142, a temperature/humidity sensor 143, an infrared sensor 144, a gyroscope sensor 145, a location sensor 146 (for example, a global positioning system (GPS)), a barometric pressure sensor 147, a proximity sensor 148, and a red-green-blue (RGB) sensor 149 (an illuminance sensor), but is not limited thereto. Functions of the respective sensors may be inferred from the name of the modules by those of ordinary skill in the art. Thus, a detailed description thereof will not be provided here.

The communicator 150 may include one or more units for communication between the device 100 and an external device or between the device 100 and a server. For example, the communicator 150 may include a short-range wireless communicator 151, a mobile communicator 152, and a broadcasting receiver 153.

The short-range communicator 151 may include a Bluetooth communicator, a Bluetooth low energy (BLE) communicator, a near-field communicator, a wireless local area network (WLAN) communicator, a Zigbee communicator, an infrared Data Association (IrDA) communicator, a Wi-Fi Direct (WFD) communicator, a ultra wideband (UWB) communicator, or an Ant+ communicator, but is not limited thereto.

The mobile communicator 152 transceives a wireless signal with at least one selected from the group consisting of a base station, an external terminal, and a server on a mobile communication network. The wireless signals may include a voice call signal, a video phone call signal or various forms of data used to transceive text or multimedia messages.

The broadcasting receiver 153 receives broadcasting signals and/or broadcasting-related information from outside via a broadcasting channel. The broadcasting channel may be a satellite channel or a terrestrial broadcast channel. According to exemplary embodiments, the device 100 may not include the broadcasting receiver 153.

The A/V inputter 160 functions to input audio or video signals, and may include a camera 161 and a microphone 162. The camera 161 may obtain an image frame such as a still image or a moving image through an image sensor, in a video phone mode or a photographing mode. An image captured through the image sensor may be processed through the controller 120 or an additional image processing unit (not shown).

An image frame processed by the camera 161 may be stored in the memory 170 or transmitted to the outside through the communicator 150. The A/V inputter 160 may include two or more cameras 161 according to a configuration type of a terminal.

The microphone 162 receives an external sound signal and processes the external sound signal into electrical voice data. For example, the microphone 162 may receive a sound signal from an external device or a speaker. The microphone 162 may employ various noise removal algorithms for removing noise that may be generated in a process of receiving an input of an external sound signal.

The memory 170 may store a program for processing and controlling the controller 120. The memory 170 may also store data which is input or output (for example, a plurality of menus, a plurality of first-layer sub-menus respectively corresponding to the plurality of menus, a plurality of second-layer sub-menus respectively corresponding to the plurality of first-layer sub-menus, or the like).

The memory 270 may include at least one storage medium selected from the group consisting of a flash memory, a hard disk, a multimedia card micro, a card-type memory such as a secure digital (SD) or extreme digital (XD) memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. Additionally, the device 100 may operate a web storage or a cloud server for performing a storage function of the memory 170 on the internet.

The programs stored in the memory 170 may be classified into a plurality of modules according to functions. For example, the programs may be classified into a user interface (UI) module 171, a touchscreen module 172, and an alarm module 173.

The UI module 171 may provide a specialized UI or graphical user interface (GUI) which interworks with the device 100 according to applications. The touchscreen module 172 may detect a touch gesture on a touchscreen by a user and transmit information about the touch gesture to the controller 120. According to an exemplary embodiment, the touchscreen module may recognize and analyze a touch code. The touchscreen module 172 may be formed of additional hardware that includes a controller.

Various types of sensor may be disposed inside or near the touchscreen, in order to detect a touch or a proximity touch on the touchscreen. An example of a sensor for detecting a touch on the touchscreen may be a tactile sensor. The tactile sensor is a sensor for detecting a contact with a particular object to such a degree that humans may feel it or to a higher degree. The tactile sensor may detect various types of information such as information about a roughness of a contact surface, a hardness of a contact object, or a temperature at a contact point.

Additionally, an example of a sensor for detecting a touch on the touchscreen is a proximity sensor.

The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor. Touch gestures of a user may include a tap, a touch and hold, a double-tap, a drag, panning, a flick, a drag-and-drop, and a swipe.

The notification module 173 may generate a signal for indicating event generation from the device 100. An example of an event generated by the device 100 may be call signal reception, message reception, key signal input, schedule notification, or the like. The notification module 173 may output a notification signal in the form of a video signal via the display 131, in the form of an audio signal via the audio outputter 132, or in the form of a vibration signal via the vibration motor 133.

The exemplary embodiments can be implemented in a form of executable program command through a variety of computer means recordable to computer-readable media. The computer-readable media may include solely or in combination, program commands, data files and data structures. The program commands recorded to the media may be components specially designed for exemplary embodiments or may be usable to a skilled person in a field of computer software. Computer-readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of displaying an object, the method being performed by a device, the method comprising:
    displaying a plurality of objects on a display of the device based on an execution of a first application;
    identifying a target object that includes an identification mark, from among the plurality of objects, based on a first detection of a hovering inputter;
    determining a type of a first operation related to the target object, from among a plurality of predetermined operations that are performable by the device, based on a type of the identification mark;
    determining particular operation with respect to the determined type of the first operation, based on a first position information of the first detection of the hovering inputter;
    performing the first operation on the target object, based on the determined type of first operation and the determined particular operation of the first operation;
    based on a user input of changing from the first application to a second application, displaying a plurality of applications in a layered format;
    selecting the second application, from among the plurality of layered applications, based on a second detection of the hovering inputter and a second position information of the second detection of the hovering inputter;
    displaying the second application; and
    performing a second operation related to the first operation on the second application,
    wherein the first position information indicates a first distance between the device and the hovering inputter and the second position information indicates a second distance between the device and the hovering inputter, and
    wherein the first and the second positions are orthogonal to a plane formed by the display on the device.

2. The method of claim 1, wherein the determining of the first operation further comprises determining the first operation based on the identification mark of the target object and the first position of the hovering inputter.

3. The method of claim 1, wherein the determining of the first operation further comprises:
   determining a type of the first operation based on the first position; and
   determining a detail of the first operation with respect to the determined type of first operation, based on a movement of the hovering inputter.

4. The method of claim 1, wherein the plurality of predetermined operations comprises an operation of changing a location of the determined target object, an operation of deleting the determined target object, and an operation of changing at least one from among a color, a shape, and a size of the determined target object.

5. The method of claim 1, wherein the second application is different from the first application that includes the at least one object.

6. The method of claim 5, wherein the device executes the first application by outputting a first content including the at least one object, and
   the device executes the second application by outputting a second content.

7. The method of claim 1, further comprising determining the second operation when a change from the first distance to the second distance occurs within a predetermined time period.

8. A device configured to display an object, the device comprising:
   a display configured to display a plurality of objects on a display of the device;
   an input receiver configured to obtain a hovering input from a hovering inputter;
   a processor configured to:
   identify a target object that includes an identification mark, from among the plurality of objects, based on a first detection of the hovering inputter,
   determine a type of a first operation related to the target object, from among a plurality of predetermined operations that are performable by the device, based on a type of the identification mark,
   determine particular operation with respect to the determined type of the first operation, based on a first position information of the first detection of the hovering inputter first operation,
   perform the determined first operation on the target object, based on the determined type of first operation and the determined particular operation of the first operation,
   based on a user input of changing from the first application to a second application, display a plurality of applications in a layered format,
   selecting the second application, from among the plurality of layered applications, based on a second detection of the hovering inputter and a second position information of the second detection of the hovering inputter, and
   perform a second operation related to the first operation on the second application, and
   an outputter configured to display the second application,
   wherein the first position information indicates a first distance between the device and the hovering inputter and the second position information indicates a second distance between the device and the hovering inputter, and
   wherein the first and the second positions are orthogonal to a plane formed by the display on the device.

9. The device of claim 8, wherein the processor is further configured to determine the first operation based on the identification mark of the target object and the first position of the hovering inputter.

10. The device of claim 8, wherein the processor is further configured to determine a type of the first operation based on the first position, and to determine a detail of the first operation with respect to the determined type of first operation, based on movement of the hovering inputter.

11. The device of claim 8, wherein the plurality of operations comprise an operation of changing a location of the determined target object, an operation of deleting the determined target object, and an operation of changing at least one of a color, a shape, and a size of the determined target object.

12. The device of claim 8, wherein the second application is different from the first application that includes the at least one object.

13. The device of claim 8, wherein the device executes a first application by outputting a first content including the at least one object, and
   the device executes the second application by outputting a second content.

14. The device of claim 8, wherein the controller is further configured to select the second operation when a change from the first distance to the second distance occurs within a predetermined time period.

15. A non-transitory computer-readable recording storage medium having stored thereon a computer program which, when executed by a computer, performs the method of claim 1.

16. The method of claim 1, wherein the identification mark is displayed on the target object in response to the hovering inputter being located in the predetermined distance.

17. The method of claim 1, further comprising:
   identifying an image, generated according to a user input, on the object; and
   storing the identified image as the identification mark of the object.

18. The device of claim 8, wherein the processor is further configured to identify an image, generated according to a user input for the identification mark, on the object and store the identified image as the identification mark of the object.

* * * * *